United States Patent [19]

Kobashi

[11] 4,452,040
[45] Jun. 5, 1984

[54] SOOT CATCHER PURGATIVE DIESEL ENGINE FUEL SUPPLY METHOD AND APPARATUS

[75] Inventor: Kiyoshi Kobashi, Mishima, Japan

[73] Assignee: Toyota Jidosha Kabushiki Kaisha, Toyota, Japan

[21] Appl. No.: 321,332

[22] Filed: Nov. 13, 1981

[30] Foreign Application Priority Data

Nov. 17, 1980 [JP] Japan .................. 55-162135

[51] Int. Cl.³ .............................. F01N 3/02
[52] U.S. Cl. ..................... 60/274; 60/285; 60/286; 60/294; 60/311
[58] Field of Search ............ 60/274, 294, 311, 285, 60/286, 303; 123/305, 501, 502

[56] References Cited

U.S. PATENT DOCUMENTS

| | | | |
|---|---|---|---|
| 4,211,075 | 7/1980 | Ludecke | 60/311 |
| 4,359,862 | 11/1982 | Virk | 60/274 |
| 4,380,149 | 4/1983 | Ludecke | 60/274 |
| 4,391,095 | 7/1983 | Virk | 60/286 |

Primary Examiner—Douglas Hart
Attorney, Agent, or Firm—Stevens, Davis, Miller & Mosher

[57] ABSTRACT

A diesel engine is provided with a soot particle catcher. When the soot particle catcher is heavy with accumulation of soot, while the engine is operating a combustion chamber thereof is supplied with a purging supply of diesel fuel at a timing point at which heat produced by combustion of this diesel fuel within the combustion chamber is not substantially converted into mechanical work, but is vented to the exhaust system in the exhaust gases substantially completely. Thus the soot catcher is heated up, and is purged by combusting the accumulation of soot particles in it. This timing point may be the later part of the expansion stroke of the piston of the combustion chamber. The amount of this purging fuel supply may be arranged to be just enough completely to use up by combustion all excess oxygen in the combustion chamber at the timing point. Apparatus for performing this method of fuel supply may include first and second fuel injection pumps for supplying the normal type powering fuel injection pulses into the combustion chamber and also for selectively supplying such purging pulses, or may alternatively include a combination fuel injection pump of a novel sort both for supplying such powering pulses and also for selectively supplying such purging pulses.

10 Claims, 9 Drawing Figures

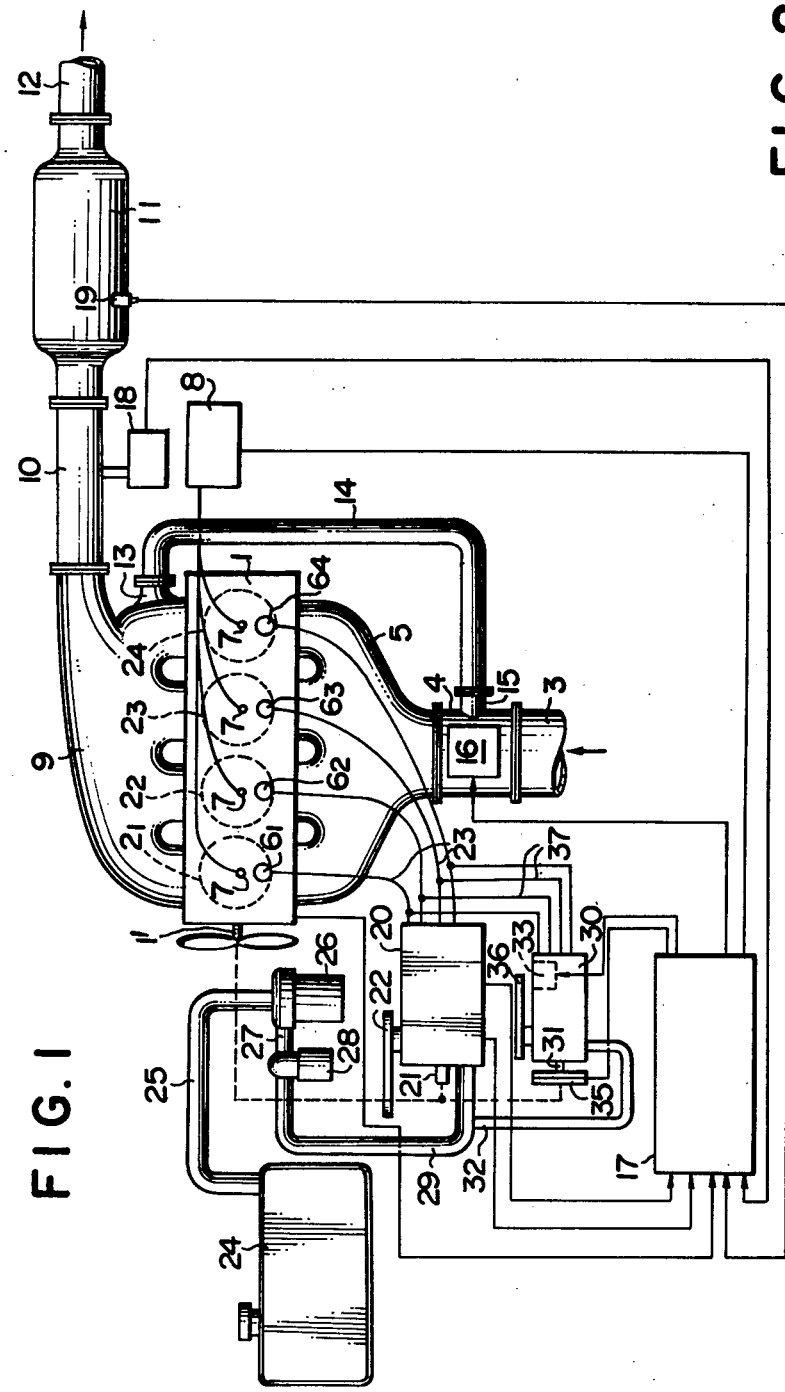
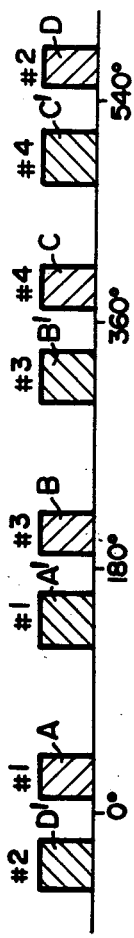
FIG. 1
FIG. 2

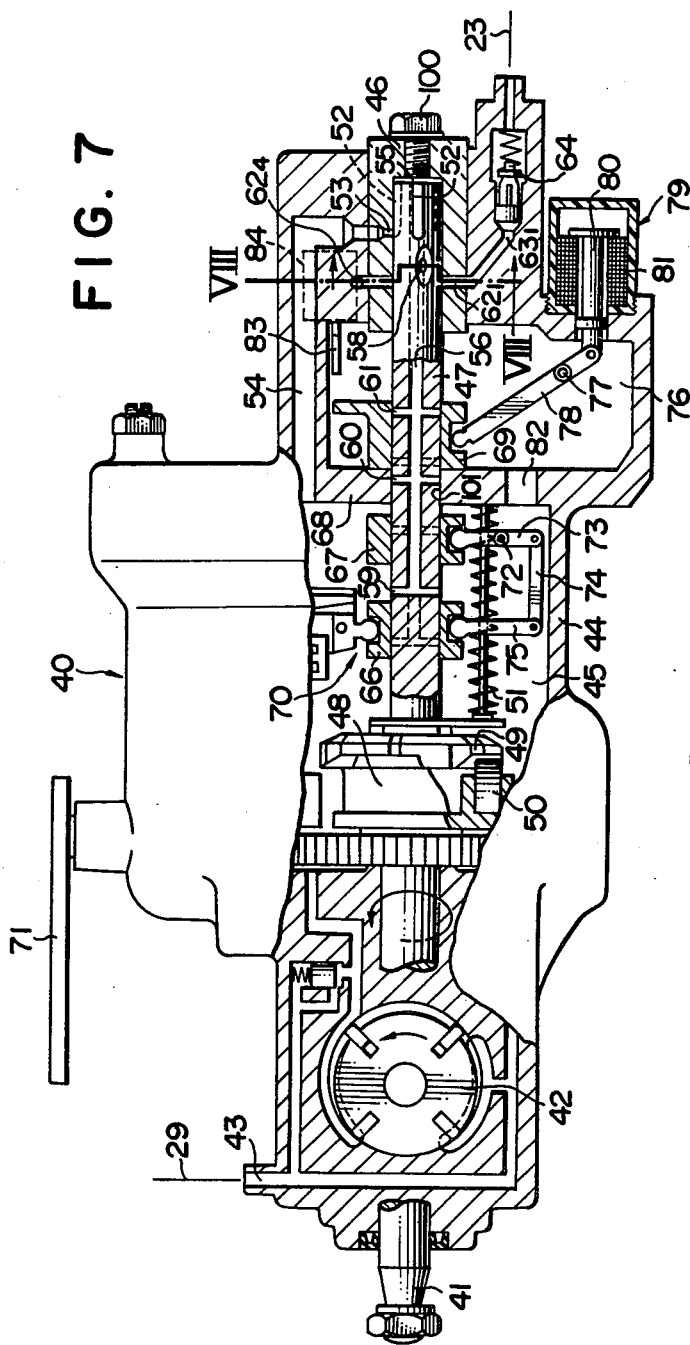
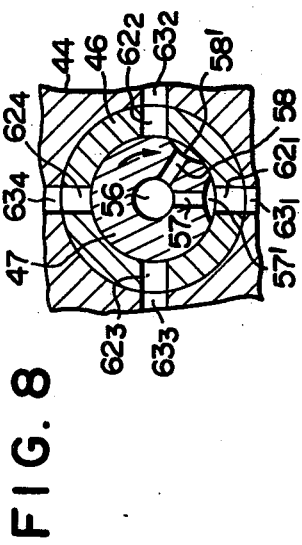
FIG. 7
FIG. 8

SOOT CATCHER PURGATIVE DIESEL ENGINE FUEL SUPPLY METHOD AND APPARATUS

BACKGROUND OF THE INVENTION

The present invention relates to a method for fuel supply to a diesel engine, and, more particularly, relates to a novel method for fuel supply to a diesel engine which is fitted with a soot catcher of a per se well known sort, which is adapted to purge the soot catcher. The present invention also relates to apparatus for performing the above mentioned fuel supply method.

Nowadays, it is common and conventional to provide a soot catcher to the exhaust system of a diesel engine. Such a soot catcher catches and accumulates carbon particles and other solid particles present in the exhaust gases of the diesel engine, and prevents their escape to the atmosphere. Since it is becoming more and more realized nowadays that such soot particles such as carbon particles may present a significant health hazard to the public, the provision of such a soot catcher is very important from the environmental and public health point of view.

Such a soot catcher normally has a filter like structure for catching the soot particles, and naturally this filter structure inevitably tends to become clogged up, over a long period of use of the soot catcher, with an accumulation of soot particles, chiefly carbon particles. When this happens, not only does the efficiency of the soot catcher for purifying the exhaust gases of the diesel engine of soot particles drop drastically, but also the resistance of the soot catcher to the flow therethrough of exhaust gases increases, which deteriorates the actual operation of the diesel engine, causing its breathing efficiency to drop, which causes a loss of engine power. This has presented a serious problem with regard to such a soot catcher; either it has been necessary to regularly remove the soot catcher in order to clean it, which is dirty, expensive, and troublesome; or some system has had to be provided for cleaning or purging the soot catcher in situ, without removing it from the engine.

It is possible to purge such a soot catcher by burning out the combustible soot particles such as carbon particles which are clogging the filter structure of the soot catcher by increasing the temperature of the exhaust gases passing through the soot catcher above the ignition temperature of said combustible soot particles.

During normal operation of the diesel engine, when the load on the diesel engine rises to a high load level wherein the excess air ratio in the exhaust gases becomes small, it is quite possible for the temperature of the exhaust gases passing through the filter structure of the soot catcher to spontaneously rise above the ignition temperature of the soot particles clogging the soot catcher, without the provision of any special means for raising the temperature of said exhaust gases. In this case, purging of the soot catcher as described above may spontaneously occur, by burning out said soot particles lodged therein as a clogging accumulation. However, this spontaneous self purging process cannot be relied upon. Diesel engines, especially in automotive vehicles, are only irregularly operated in high load conditions; and when an automotive vehicle is being operated in urban traffic it is quite unusual for the diesel engine thereof to be operated in the high load operational region. Thus such spontaneous self purging of a soot catcher might not occur in time to purge the soot catcher before its clogging had unacceptably deteriorated the functioning of the diesel engine to which it was fitted. Therefore it is necessary to practice some particular special and reliable method for raising the temperature of the exhaust gases of the diesel engine to a temperature higher than the ignition temperature of the soot particles which are becoming lodged in the soot catcher thereof, in order reliably to purge said soot catcher whenever it becomes clogged.

A first such prior art method for raising the temperature of the exhaust gases of a diesel engine to a temperature higher than the ignition temperature of the soot particles which are becoming lodged in the soot catcher thereof in order to purge said soot catcher has been to delay the timing of fuel injection to the diesel engine.

However, this first prior art purging method has suffered from the disadvantage that the temperature of the exhaust gases of the diesel engine can only be so raised when the engine is operating in a certain range of operational conditions; in other engine operational conditions the temperature of the exhaust gases does not rise up sufficiently to combust the soot particles in the particle catcher, even when fuel injection timing is delayed. Further, delaying the timing instant of fuel injection may hamper the operability of the diesel engine, and the drivability of a vehicle to which it is fitted. Accordingly the first purging method is not of very good applicability.

A second such prior art method for raising the temperature of the exhaust gases of a diesel engine to a temperature higher than the ignition temperature of the soot particles which are becoming lodged in the soot catcher thereof in order to purge said soot catcher has been to reduce the amount of excess air which is supplied to the combustion chambers of the diesel engine, by limiting the air intake of the engine.

However, this second prior art purging method has also suffered from the disadvantage that the temperature of the exhaust gases of the diesel engine can only be so raised when the engine is operating in a certain range of operational conditions; in other engine operational conditions the temperature of the exhaust gases does not rise up sufficiently to combust the soot particles in the particle catcher, even when the air intake amount of the engine is limited. Further, reducing the air intake amount of the engine also reduces the volume of the exhaust gases which are passed through the soot catcher, which means that the efficiency of heat transfer to the filter structure of the soot catcher from the exhaust gases is deteriorated. Also the amount of heat energy transferred by this reduced amount of exhaust gas is correspondingly reduced. Accordingly this second purging method is also not of very good applicability.

A third such prior art method for raising the temperature of the exhaust gases of a diesel engine to a temperature higher than the ignition temperature of the soot particles which are becoming lodged in the soot catcher thereof in order to purge said soot catcher has been to provide a separate heater, such as an oil burner or other heating device, for heating the exhaust gas up.

However, this third prior art soot catcher purging method has suffered from disadvantages related to safety and durability. In practice this solution cannot practically be used for a diesel engine for use in an automotive vehicle.

SUMMARY OF THE INVENTION

Accordingly, it is the primary object of the present invention to provide a method for supplying fuel to a diesel engine equipped with a soot particle catcher, which can reliably and properly heat up the soot particle catcher so as to purge it by combusting any accumulation of soot particles which has built up in it.

It is a further object of the present invention to provide such a method for supplying fuel to a diesel engine equipped with a soot particle catcher, for purging the soot catcher, which does not deteriorate the operability of the diesel engine.

It is a further object of the present invention to provide a method for supplying fuel to a diesel engine equipped with a soot particle catcher, for purging the soot catcher, which can be employed to purge the soot catcher at substantially any time during operation of the internal combustion engine, without any problems arising when the internal combustion engine is operating in any particular range of operational conditions.

It is a further object of the present invention to provide a method for supplying fuel to a diesel engine equipped with a soot particle catcher, for purging the soot catcher, which does not reduce the volume of exhaust gases.

It is a further object of the present invention to provide a method for supplying fuel to a diesel engine equipped with a soot particle catcher, for purging the soot catcher, which does not reduce the amount of heat provided in the exhaust gases unduly.

It is a further object of the present invention to provide a method for supplying fuel to a diesel engine equipped with a soot particle catcher, for purging the soot catcher, which does not deteriorate the efficiency of the transfer of heat from the exhaust gases to the filter structure of the soot catcher.

It is a further object of the present invention to provide a method for supplying fuel to a diesel engine equipped with a soot particle catcher, for purging the soot catcher, which does not present any problems due to safety.

It is a further object of the present invention to provide a method for supplying fuel to a diesel engine equipped with a soot particle catcher, for purging the soot catcher, which injects purging fuel into the combustion chambers of the diesel engine to be combusted, heat resulting from said combustion being substantially completely released from the combustion chambers in the exhaust gases of the engine without being converted into mechanical work, so as to heat up the soot catcher and so as to combust any accumulation of soot particles which has built up in it.

It is a further object of the present invention to provide such a method for supplying fuel to a diesel engine equipped with a soot particle catcher, for purging the soot catcher, which uses substantially all the excess air available in the combustion chambers of the engine, after normal fuel injection and combustion has taken place to drive the engine, for combustion of said purging fuel.

It is a further object of the present invention to provide an apparatus for supplying fuel to a diesel engine equipped with a soot particle catcher, for purging the soot catcher, which practices a method which achieves the above described objects.

It is a further object of the present invention to provide an apparatus for supplying fuel to a diesel engine equipped with a soot particle catcher, for purging the soot catcher, which injects purging fuel into the combustion chambers of the diesel engine to be combusted, heat resulting from said combustion being substantially completely released from the combustion chambers in the exhaust gases of the engine without being converted into mechanical work, so as to heat up the soot catcher and so as to combust any accumulation of soot particles which has built up in it, and which utilizes two separate fuel injection pumps for the injection of purging fuel and for normal injection of powering fuel for the engine.

It is a further and alternative object of the present invention to provide an apparatus for supplying fuel to a diesel engine equipped with a soot particle catcher, for purging the soot catcher, which injects fuel into the combustion chambers of the diesel engine to be combusted, heat resulting from said combustion being substantially completely released from the combustion chambers in the exhaust gases of the engine without being converted into mechanical work, so as to heat up the soot catcher and so as to combust any accumulation of soot particles which has built up in it, and which utilizes a combined fuel injection pump both for the injection of purging fuel and for normal injection of powering fuel for the engine.

It is a yet further object of the present invention to provide an apparatus for supplying fuel to a diesel engine equipped with a soot particle catcher, for purging the soot catcher, which incorporates a compact structure for said combined fuel injection pump.

It is a yet further object of the present invention to provide such an apparatus for supplying fuel to a diesel engine equipped with a soot particle catcher, for purging the soot catcher, in which said combined fuel injection pump incorporates a system for completely shutting off fuel when the engine is switched off.

According to the present invention, these of these objects relating to a method, and others, are accomplished by, for a diesel engine comprising a sooft catcher, a combustion chamber being defined within said diesel engine: a method of supplying diesel fuel to said diesel engine, wherein while said diesel engine is operating diesel fuel is supplied into said combustion chamber at a first timing point of the operation of said diesel engine at which heat produced by combustion of said diesel fuel within said combustion chamber is not substantially converted into mechanical work.

According to such a method, this heat produced by combustion of said diesel fuel within said combustion chamber which is not substantially converted into mechanical work is as a matter of course released into the exhaust system of the engine in the exhaust gases thereof, so as to enter into the soot catcher and so as to heat up said soot catcher. This will cause the combustion of any soot particles or the like which have been accumulated within said soot catcher, thus purging it.

Further, according to a particular aspect of the present invention, these and other objects are more particularly and concretely accomplished by a method as described above, wherein simultaneously diesel fuel is supplied into said combustion chamber at a second timing point of the operation of said diesel engine at which heat produced by combustion of said diesel fuel within said combustion chamber is substantially converted into mechanical work.

According to such a method, this mechanical work produced in a substantial amount by combustion of said diesl fuel which is supplied into said combustion chamber at said second timing point of the operation of said diesel engine is effective for maintaining the operation of said diesel engine.

Further, according to a particular aspect of the present invention, these and other objects are more particularly and concretely accomplished by such a method as described above, wherein the amount of such supplied diesel fuel is varied according to the amount of excess oxygen present within said combustion chamber, just before said first timing point, so as to be approximately the quantity of fuel which can be combusted by said excess oxygen.

According to such a method, such purging diesel fuel is supplied in the maximum amount which can properly be combusted by the excess oxygen present in the combustion chamber of the engine, and thus the soot catcher is heated up to the maximum possible amount.

Further, according to another aspect of the present invention, these of these objects relating to a method, and others, are accomplished by, for a diesel engine comprising a soot catcher, a combustion chamber being defined within said diesel engine: apparatus for fuel supply to said diesel engine, comprising: a first diesel fuel injection pump which is selectively operable in a predetermined definite phase relation with said diesel engine, and which when so operated supplies diesel fuel into said combustion chamber at a first timing point of the operation of said diesel engine at which heat produced by combustion of said diesel fuel within said combustion chamber is not substantially converted into mechanical work.

According to such a structure, this first fuel injection pump, when so operated, provides said purging fuel injection for heating up said soot catcher, as described above.

Further, according to a particular aspect of the present invention, these and other objects relating to a method may be alternatively accomplished by, for a diesel engine comprising a soot catcher, a combustion chamber being defined within said diesel engine: apparatus for fuel supply to said diesel engine, comprising: a combination diesel fuel injection pump which during the operation of said diesel engine is always operated in a predetermined definite phase relation with said diesel engine, which is selectively operable so as to supply diesel fuel into said combustion chamber at a first timing point of the operation of said diesel engine at which heat produced by combustion of said diesel fuel within said combustion chamber is not substantially converted into mechanical work, and which also always during the operation of said diesel engine supplies diesel fuel into said combustion chamber at a second timing point of the operation of said diesel engine at which heat produced by combustion of said diesel fuel within said combustion chamber is substantially converted into mechanical work.

According to such a structure, this combination diesel fuel injection pump can provides said purging pulses of diesel fuel injection for heating up said soot catcher, as described above; and can also provide the normal type powering pulses of injected diesel fuel for powering the diesel engine.

If such a combination fuel injection pump is provided as described above, the objects of this invention can be more concretely and definitely accomplished by an apparatus as described above, wherein said combination pump comprises: (a) a substantially cylindrical plunger member which reciprocates to and fro in its axial direction, a pressure chamber being defined at one end of said plunger member, and an axially extending hole being formed in said plunger member from said one end thereof and being communicated to the outside of said plunger member via a first spill port and a second spill port which are formed in said plunger member so as to communicate between said axially extending hole and the outer cylindrical surface of said plunger member; (b) a first spill ring mounted around the outer cylindrical surface of said plunger member in the region of said first spill port so as closely to cooperate with said outer cylindrical surface which slides therethrough, said first spill ring being mounted to said combination pump at a position along the axis of said plunger member which is altered along with engine load so as to be moved in the direction of said one end of said pump plunger when engine load increases; (c) a second spill ring mounted around the outer cylindrical surface of said plunger member in the region of said second spill port so as closely to cooperate with said outer cylindrical surface which slides therethrough, said second spill ring being mounted to said combination pump at a position along the axis of said plunger member which is altered along with engine load so as to be moved in the direction of said one end of said pump plunger when engine load decreases; (d) diesel fuel in said pressure chamber squeezed when said plunger member moves towards said pressure chamber with said first spill ring covering said first spill port and with said second spill ring covering said second spill port being ejected therefrom into said combustion chamber as said supply of diesel fuel into said combustion chamber at said second timing point of the operation of said diesel engine at which heat produced by combustion of said diesel fuel within said combustion chamber is substantially converted into mechanical work in a powering pulse of diesel fuel the timing point of the cessation of which is regulated by the axial position of said first spill ring; (e) diesel fuel in said pressure chamber squeezed when said plunger member moves towards said pressure chamber with said first spill ring covering said first spill port and with said second spill ring covering said second spill port being ejected therefrom into said combustion chamber as said supply of diesel fuel into said combustion chamber at said first timing point of the operation of said diesel engine at which heat produced by combustion of said diesel fuel within said combustion chamber is not substantially converted into mechanical work in a purging pulse of diesel fuel the timing point of the cessation of which is regulated by the axial position of said second spill ring; and (f) a means for selectively suppressing said supplying of said purging pulse of diesel fuel into said combustion chamber at said first timing point of the operation of said diesel engine at which heat produced by combustion of said diesel fuel within said combustion chamber is not substantially converted into mechanical work.

According to such a pump structure, when said means for selectively suppressing said supplying of said purging pulse of diesel fuel into said combustion chamber is being used, then only said powering pulse of diesel fuel is supplied into said combustion chamber; but, on the other hand, when said means for selectively suppressing said supplying of said purging pulse of diesel fue into said combustion chamber is not being used, then both said powering pulse and also said purging pulse of diesel fuel are supplied into said combustion chamber, so that in the fashion described above the heat released by the combustion of said purging pulse within said combustion chamber is not substantially converted into mechanical work but is released into the exhaust system of the engine to heat up the soot catcher and thus to purge said soot catcher. Further, in this case, the timing period of supply of this purging pulse is regulated according to the movement of said second spill ring, the cessation of said supply of said purging pulse being delayed and the total amount of fuel supplied in said purging pulse being increased when said second spill ring is moved in the direction of said pressure chamber, i.e. with decrease in engine load; while, in either above described case, the timing period of supply of the powering pulse is regulated according to the movement of said first spill ring, the cessation of said supply of said powering pulse being delayed and the total amount of fuel supplied in said powering pulse being increased when said first spill ring is moved in the direction of said pressure chamber, i.e. with increase in engine load.

Further, according to a particular aspect of the present invention, these and other objects are more particularly and concretely accomplished by such an apparatus as described above, wherein said plunger member is further formed with a third spill port which communicates between said axially extending hole and the outer cylindrical surface of said plunger member; and wherein said means for selectively suppressing said supplying of said purging pulse of diesel fuel into said combustion chamber at said first timing point comprises a third spill ring mounted around the outer cylindrical surface of said plunger member in the region of said third spill port so as closely to cooperate with said outer cylindrical surface which slides therethrough, said third spill ring being mounted to said combination pump at a position along the axis of said plunger member which is altered, according to whether or not it is desired to provide said purging pulse of diesel fuel into said combustion chamber at said first timing point, so as when it is desired to provide said purging pulse of diesel fuel into said combustion chamber at said first timing point said third spill ring covers said third spill port during all the timing interval of said powering pulse and also during all the timing interval of said purging pulse; and so as when it is desired not to provide said purging pulse of diesel fuel into said combustion chamber at said first timing point said third spill ring covers said third spill port during all the timing interval of said powering pulse but uncovers said third spill port during all the timing interval of said purging pulse.

According to such a construction for said means for selectively suppressing said supplying of said purging pulse of diesel fuel into said combustion chamber, as the position of said third spill ring along the axis of said plunger member is altered, either when said third spill ring covers said third spill port during all the timing interval of said powering pulse and also during all the timing interval of said purging pulse both the production of said powering pulse and also the production of said purging pulse are not interfered with by escape of diesel fuel from said third spill port, or when said third spill ring covers said third spill port during all the timing interval of said powering pulse but uncovers said third spill port during all the timing interval of said purging pulse the production of said powering pulse is not interfered with by escape of diesel fuel from said third spill port, but the production of said purging pulse is prevented due to escape of diesel fuel from said third spill port, which releases the pressure in said pressure chamber.

Further, according to a particular aspect of the present invention, these and other objects are more particularly and concretely accomplished by such an apparatus as described above, wherein said third spill ring can further be moved to a position wherein during all the movement of said plunger member said third spill ring does not close said third spill port.

According to such a pump structure, when said third spill ring is moved to said position in which it always opens said third spill port, then as a matter of course neither said powering pulse nor said purging pulse can be produced by said combined fuel pump, because both of them are suppressed due to escape of diesel fuel from said third spill port at all times, which thus at all times releases the pressure in said pressure chamber.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 1 is a schematic structural view, showing the general structure of a diesel engine, incorporating a soot particle catcher, which is equipped with a first preferred embodiment of the fuel supply apparatus according to the present invention in which separate first and second fuel injection pumps are provided for respectively powering pulses and purging pulses of injected diesel fuel, for practicing a preferred embodiment of the fuel supply method according to the present invention;

FIG. 2 is a chart, in which fuel supply amount is the ordinate, and crank angle is the abscissa, showing the relation between the angular position of the crankshaft of the diesel engine shown in FIG. 1 and the amounts of fuel being injected into the various cylinders thereof;

FIG. 7 is a part schematic part cross sectional view, showing the detailed construction of a combined diesel fuel injection pump incorporated in said second preferred embodiment of the fuel supply apparatus according to the present invention shown schematically in FIG. 6;

FIG. 8 is an enlarged cross sectional view through a pump plunger member and a pump sleeve member of the combined diesel fuel injection pump shown in FIG. 7, taken in a broken plane shown by the line VIII—VIII in FIG. 7.

DESCRIPTION OF THE PREFERRED EMBODIMENTS

Figure 3:
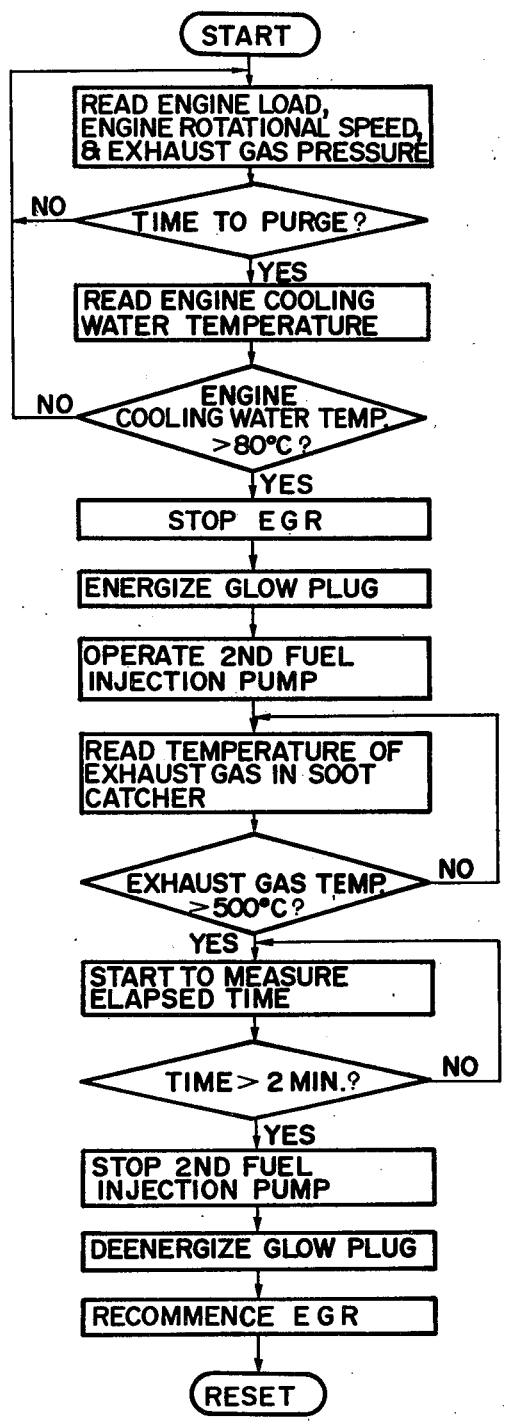
FIG. 3 is a flow chart, showing the operation of a computer program for a control device (which is a microcomputer) incorporated in the above mentioned first preferred embodiment, for practicing said preferred embodiment of the fuel supply method according to the present invention.

The present invention will now be described with reference to several preferred embodiments thereof, and with reference to the appended drawings.

THE FIRST EMBODIMENT

FIG. 1 is a schematic structural view, showing a diesel engine, incorporating a soot particle catcher, which is equipped with the first preferred embodiment of the fuel supply apparatus according to the present invention.

BASIC CONSTRUCTION OF THE FIRST EMBODIMENT

In FIG. 1, the reference numeral 1 generally denotes the diesel internal combustion engine, which is exemplarily a four cylinder in line type diesel engine, incorporating four combustion chambers $2_1$, $2_2$, $2_3$, and $2_4$. These combustion chambers $2_1$ through $2_4$ are designed to suck in air from the atmosphere through, in the following specified order, an air cleaner (not shown in the drawing), an intake tube 3, an exhaust gas recirculation valve 4, and an intake manifold 5 which distributes the air between said combustion chambers $2_1$ through $2_4$, in a per se well known way.

Each of the combustion chambers $2_1$, $2_2$, $2_3$, and $2_4$ is provided with a fuel injection nozzle. These fuel injection nozzles corresponding respectively to these combustion chambers $2_1$, $2_2$, $2_3$, and $2_4$ are designated by the reference numerals $6_1$, $6_2$, $6_3$, and $6_4$, and each of them is adapted to inject a fine spray of diesel fuel at high pressure into its corresponding combustion chamber, in a per se well known way. In the shown exemplary diesel engine 1, the firing order of the cylinders is 1-3-4-2, and the fuel injection order for the nozzles $6_1$ through $6_4$ is of course the same; in other words, the cyclic order of cylinder operation is: the first cylinder, the third cylinder, the fourth cylinder; the second cylinder; and then the first cylinder again.

Each of the combustion chambers $2_1$, $2_2$, $2_3$, and $2_4$ is provided with a glow plug, all of these four glow plugs being designated by the same reference numeral 7. The supply of electrical energy to all of these glow plugs 7 is provided in parallel from a glow plug energization and control device 8.

Exaust gases are exhausted from the combustion chambers $2_1$, $2_2$, $2_3$, and $2_4$ of the diesel engine 1 into an exhaust manifold 9, which is communicated in turn to an exhaust pipe 10 which leads to the inlet side of a soot catcher 11, the outlet side of which is connected to a second exhaust pipe 12 which leads to the atmosphere. The soot catcher 11 is of the above described per se well known sort, which incorporates a filter structure for catching the soot particles present in the exhaust gases passing therethrough; and which is however somewhat prone to becoming clogged up after a long period of service. In more detail, the soot catcher 11 is adapted to catch the combustible solid particles such as carbon particles present in the exhaust gases passing therethrough, while allowing substantially free flow of said exhaust gases therethrough. Such a soot catcher 11 may comprise a filter structure including a multi screen element which is made of ceramic or metal held within a casing of stainless steel or other heat resistant material able to withstand the temperature of the hot exhaust gases passing through the soot catcher 11. It is generally preferable to coat such a multi screen element with a catalyst for catalyzing the combustion of whatever combustible materials may be present in the exhaust gases.

An exhaust gas pressure sensor 18 is provided at an intermediate part of the exhaust pipe 10, upstream of the soot catcher 11, and an exhaust gas temperature sensor 19 is provided to said soot catcher 11 for sensing the temperature of the exhaust gas present within said soot catcher 11. At an intermediate part of the exhaust manifold 9 there is provided an exhaust gas take out port 13 for allowing a part of the exhaust gases of the internal combustion engine 1 within said exhaust manifold 9 to pass therethrough in order to recirculate said exhaust gases, so as to provide so called EGR. This exhaust gas take out port 13 is communicated, via an exhaust gas recirculation passage 14, to the input port 15 of the previously mentioned exhaust gas recirculation control valve 4. This exhaust gas recirculation control valve 4 comprises a valve element, not shown in the drawing, which controls the amount of exhaust gas recirculation which is permitted through and by said exhaust gas recirculation control valve 4. In other words, this valve element controls the effective flow resistance of the exhaust gas recirculation control valve 4. The valve element is driven to and fro by an electromagnetic actuator 16. And the activating electrical energy for this electromagnetic actuator 16, as well as a control signal for the glow plug energization and control device 8, is selectively provided from a control device 17, which will be explained in more detail later. Further, the output electrical signals from said exhaust gas pressure sensor 18 and from said exhuast gas temperature sensor 19 are supplied to said control device 17, as will also be explained in more detail later.

Powering fuel injection to the diesel internal combustion engine 1 is provided from a first fuel injection pump 20, which will now be described. This first or main fuel injection pump 20 is provided for injecting fuel into the combustion chambers $2_1$, $2_2$, $2_3$, and $2_4$, in a per se well known way. This main fuel injection pump 20 may be a per se well known Bosch type VE fuel injection and distribution pump, and comprises: a drive shaft 21 which is rotated by the crankshaft (not shown) of the diesel internal combustion engine 1 and is maintained in a predetermined definite rotational phase relationship with respect thereto, as schematically shown in FIG. 1 by the dashed line; a fuel supply pump (not shown in the drawing) which is rotated by the drive shaft 21 and which sucks in fuel from a fuel tank 24, through a fuel conduit 25, through a fuel/water separator 26, through another fuel conduit 27, through a fuel filter 28, and through a third fuel conduit 29, in that order; and a fuel metering and distribution device which supplies metered powering pulses of diesel fuel at high pressure at correct timing points to the four combustion chambers $2_1$, $2_2$, $2_3$, and $2_4$, as will be more fully described later. The amount of each of these powering pulses of injected diesel fuel is determined by said fuel metering and distribution device in such a way that it increases according to increase in the load on the diesel internal combustion engine 1, and in more detail is determined in relation to the rotational angle of a control lever 22—which is fixed to a rotatable shaft of the main fuel injection pump 20, and which is turned by a linkage, not shown in the drawing, which connects its extremity to an accelerator pedal of the vehicle (also not shown in the drawing) in a per se well known way—and also in relation to the action of a governor of a per se well known sort, incorporated in the main fuel injection pump 20 but also not shown in the drawing. Thus the amount of fuel injected to each of the combustion chambers $2_1$, $2_2$, $2_3$, and $2_4$, in each powering pulse, is controlled according to the amount of depression of said accelerator pedal, and also according to the speed of rotation of said drive shaft 21 of said main fuel injection pump 20, and increases with increase in engine load.

The main fuel injection pump 20 is connected to the fuel injection nozzles $6_1$, $6_2$, $6_3$, and $6_4$ through four fuel distribution conduits, which are all designated in FIG. 1 by the same reference numeral 23, so as to send said metered powering pulses of diesel fuel thereto. The time instant of commencement of the fuel injection powering pulse to each of the fuel injection nozzles $6_1$, $6_2$, $6_3$, and $6_4$ is so arranged that the corresponding piston (not shown) of the corresponding combustion chamber $2_1$, $2_2$, $2_3$, and $2_4$ at said powering injection instant is at a first timing position at which fuel injection into said combustion chamber is effective for converting thermal energy resulting from the subsequent combustion of said fuel into mechanical energy, i.e. into engine work output. In other words, the time instant of commencement of the fuel injection powering pulse into each one of the combustion chambers $2_1$, $2_2$, $2_3$, and $2_4$ is during the last part of the compression stroke of the piston corresponding to said combustion chamber. This is of course the per se well known timing for such powering diesel fuel injection into a diesel engine. The main fuel injection pump 20 is as a matter of course always activated during operation of the internal combustion engine 1, in order to provide the diesel fuel required for said operation.

Purging fuel injection to the diesel internal combustion engine 1 is provided from a second fuel injection pump 30, which will now be described. This second or purging fuel injection pump 30 is provided for injecting fuel into the combustion chambers $2_1$, $2_2$, $2_3$, and $2_4$, in a novel way, which will be described hereinafter. This purging fuel injection pump 30 may be a per se well known Bosch type VE fuel injection and distribution pump, and comprises: a drive shaft 31 which is selectively rotated by the crankshaft (not shown) of the diesel internal combustion engine 1, via an electromagnetic clutch 35 which can be selectively engaged or disengaged according to the selective supply of actuating electrical energy thereto, as schematically shown in FIG. 1 by the dashed line, said drive shaft 31, when selectively so engaged to said crankshaft by said electromagnetic clutch 35, being maintained in a predetermined definite rotational phase relationship with respect to said crankshaft; a fuel supply pump (not shown in the drawing) which is rotated by the drive shaft 31 and which sucks in fuel from an intermediate portion of the aforementioned third fuel conduit 29; a fuel shut off valve 33, which is electrically operated by selective supply of electrical energy from the control device 17, and which selectively cuts off said supply of fuel by the aforementioned fuel supply pump to the second fuel injection pump 30, when supplied with a "CLOSE" signal from the control device 17, while it allows said supply of fuel by the aforementioned fuel supply pump to the second fuel injection pump 30, when supplied with an "OPEN" signal from the control device 17; and a fuel metering and distribution device which supplies metered purging pulses of diesel fuel at high pressure at correct timing points to the four combustion chambers $2_1$, $2_2$, $2_3$, and $2_4$, as will be more fully described later. The amount of each of these purging pulses of injected diesel fuel is determined by said fuel metering and distribution device in such a way that it decreases according to increase in the load on the diesel internal combustion engine 1, and in more detail is determined in relation to the rotational angle of a control lever 36, which is fixed to a rotatable shaft of the purging fuel injection pump 30, and which is turned by a linkage, not shown in the drawing, which connects its extremity to said accelerator pedal of the vehicle, also not shown in the drawing. Thus the amount of fuel injected to each of the combustion chambers $2_1$, $2_2$, $2_3$, and $2_4$, in each purging pulse, is controlled so as to decrease with increase in engine load.

The purging fuel injection pump 30 is connected to the fuel injection nozzles $6_1$, $6_2$, $6_3$, and $6_4$ through four fuel distribution conduits, which are all designated in FIG. 1 by the same reference numeral 37 and each of which communicates to an intermediate point of one of the fuel distribution conduits 23, so as to send said metered purging pulses of diesel fuel thereto. The time instant of commencement of the fuel injection purging pulse from the purging fuel injection pump 30 to each of the fuel injection nozzles $6_1$, $6_2$, $6_3$, and $6_4$ is so arranged that the corresponding piston (not shown) of the corresponding combustion chamber $2_1$, $2_2$, $2_3$, and $2_4$ at said purging injection instant is in a second timing position at which fuel injection into said combustion chamber is not substantially effective for converting thermal energy resulting from the subsequent combustion of said fuel into mechanical energy, i.e. engine work output; so that substantially all of said thermal energy is released as heat into the exhaust system of the internal combustion engine 1. The time instant of commencement of the purging fuel injection pulse into each of the combustion chambers $2_1$, $2_2$, $2_3$, and $2_4$ may be during the last part of the expansion stroke of the piston corresponding to said combustion chamber. The purging fuel injection pump 30 is only selectively activated during operation of the internal combustion engine 1, in order to provide the diesel fuel required for purging operation, as will be explained later, according to the selective engagement of said electromagnetic clutch 35.

OPERATION OF THE FIRST EMBODIMENT

In FIG. 2, there is shown a timing chart for the supplying of the powering fuel injection pulses from the main fuel injection pump 20 and for the supplying of the purging fuel injection pulses from the purging fuel injection pump 30, in the circumstance that both of these pulses are being supplied. The pulses designated in FIG. 2 by A, B, C, and D are the powering fuel injection pulses, which are supplied to the combustion chambers $2_1$, $2_2$, $2_3$, and $2_4$ when the pistons thereof are in their first positions, and the pulses designated in FIG. 2 by A', B', C', and D' are the purging fuel injection pulses, which are supplied to the combustion chambers $2_1$, $2_2$, $2_3$, and $2_4$ when the pistons thereof are in their second positions. In FIG. 2 the height of the shaded areas indicates the relative magnitudes of the flows of diesel fuel in the powering pulses and the purging pulses, and thus in the shown operation the magnitudes of these flows are the same. Further, the powering and purging pulses designated respectively by A and A' are those supplied to the first combustion chamber $2_1$, the powering and purging pulses designated respectively by B and B' are those supplied to the third combustion chamber $2_3$, the powering and purging pulses designated respectively by C and C' are those supplied to the fourth combustion chamber $2_4$, and the powering and purging pulses designated respectively by D and D' are those supplied to the second combustion chamber $2_2$, according to the above described firing order for the cylinders of the internal combustion engine 1 of 1-3-4-2.

Now the operation of the fuel supply system shown in FIG. 1, which is the first preferred embodiment of the method according to the present invention, will be described, with reference to the flow chart shown in FIG. 3. In fact, the control device 17 may be a microcomputer which executes a program based upon this flow chart, possibly also performing other regulatory tasks for the internal combustion engine 1 and/or the vehicle incorporating it. The control device 17 continuously receives a signal from the internal combustion engine 1 representative of engine cooling water temperature, and also receives signals from the main fuel injection pump 20 representative of engine load and engine rotational speed, as schematically indicated by directed signal lines in FIG. 1; no particular means are shown in the figure or further discussed here for provision of these signals, because such means are per se well known and conventional, in various different forms. The control device 17, thus, receives signals representative of engine load, engine revolution speed, engine cooling water temperature, exhaust gas pressure, and exhaust gas temperature; and provides, as outlined above, control signals for the electromagnetic clutch 35, the fuel shut off valve 33, the electromagnetic actuator 16, and the glow plug energization and control device 8. The algorithm according to which this is done, and the results thereof, will now be explained.

First, according to the algorithm illustrated by the flow chart of FIG. 3, in the START condition the control device 17 reads the current values of engine load and engine rotational speed, and also reads the current value of exhaust gas pressure upstream of the soot catcher 11 from the exhaust gas pressure sensor 18. If the pressure of the exhaust gas upstream of the soot catcher 11 as indicated by said exhaust gas pressure sensor 18 is over a certain predetermined value, then according to this algorithm the control device 17 judges that more than a specified amount of combustible particles, i.e. soot, has been caught by the soot catcher 11, which accordingly requires to be purged. Thus, if said exhaust gas pressure is not greater than said predetermined value, then control returns to the start, to loop. On the other hand, if said exhaust gas pressure is greater than said certain predetermined value, then the control device 17 reads the current value of engine cooling water temperature. If the engine cooling water temperature is less than a predetermined value, which in the shown exemplary embodiment is 80° C., then control again returns to the start, to loop, since soot catcher purging should not be performed in such a circumstance. On the other hand, if the engine cooling water temperature is higher than said certain predetermined value of 80° C., then control passes to the next step, in which the control device 17 sends a "CLOSE" signal to the electromagnetic actuator 16 for completely shutting off exhaust gas recirculation from the exhaust gas take out port 13 through the exhaust gas recirculation passage 14 and the input port 15 of the exhaust gas recirculation control valve 4 to pass into the intake manifold 5. This ensures that exhaust gas recirculation is completely stopped, and accordingly ensures that as much excess oxygen as possible is present within the combustion chambers $2_1$ through $2_4$. And then the control device 17 sends an activation signal to the glow plug energization and control device 8, which causes said glow plug energization and control device 8 to send electrical energy to the glow plugs 7 so as to cause them to become hot.

Next, the control device 17 sends out signals for starting the supply of purging pulses of diesel fuel from the second or purging fuel injection pump 30; in more detail, the control device 17 sends an "OPEN" signal to the fuel shut off valve 33 incorporated in said purging fuel injection pump 30, and also sends an electrical signal to the electromagnetic clutch 35, so as to engage said electromagnetic clutch 35 and so as to cause the crankshaft (not shown) of the internal combustion engine 1 to commence rotating the drive shaft 31 of the purging fuel injection pump 30, said drive shaft 31 being as mentioned above rotationally engaged to said crankshaft in a predetermined definite rotational phase relationship. Accordingly, fuel is supplied to the purging fuel injection pump 30, and also the drive shaft 31 thereof is rotated, and accordingly purging pulses of diesel fuel at high pressure are provided at appropriate timing instants, via the fuel distribution conduits 37 and the fuel distribution conduits 23, to the four fuel injection nozzles $6_1$, $6_2$, $6_3$, and $6_4$, i.e. at timing instants as shown in FIG. 2 which are so arranged that the heat resulting from the combustion of these purging pulses of diesel fuel is not substantially converted into mechanical energy, but is substantially completely directly released to the exhaust system of the internal combustion engine 1. The magnitude of these purging pulses of injected diesel fuel is regulated, as explained above, according to the load on the internal combustion engine 1. Meanwhile, of course, the powering pulses of diesel fuel injection which are being provided by the main fuel injection pump 20 continue to be provided to the four nozzles $6_1$, $6_2$, $6_3$, and $6_4$ in a per se well known manner, via the fuel distribution conduits 23, at timing instants as also shown in FIG. 2; and thus, although the purging pulses of injected diesel fuel are not substantially helpful for powering the diesel internal combustion engine 1, the engine 1 continues to rotate and to provide useful output power for powering an automobile or the like, because of said supply of powering fuel injection pulses, the heat produced by the combustion of which is to a substantial amount converted into mechanical rotational energy.

The effect of this supply of purging fuel injection pulses is as follows. The purging diesel fuel so injected into the combustion chambers $2_1$, $2_2$, $2_3$, and $2_4$, which as explained above is delivered during the last part of the expansion stroke of the piston of each cylinder, is ignited at this time by the glow plug 7 within that cylinder, and/or by the heat of the combustion gases still present within this cylinder (for the energization of the glow plugs 7 during purging of the soot catcher 11, although beneficial, is not essential to this invention), and thus is combusted within said combustion chambers $2_1$, $2_2$, $2_3$, and $2_4$, the combustion residues resulting from this combustion being exhausted from the combustion chambers along with the general flow of exhaust gases. Meanwhile, of course, the usual injection of powering fuel injection pulses into the combustion chambers $2_1$, $2_2$, $2_3$, and $2_4$ by the main fuel injection pump 20 continues, and this powering fuel injected is in fact generally ignited by compression ignition alone, without any particular help being provided by the glow plugs 7, except when the engine is being started or operated in a cold operational condition; and, because of the timing of these injections of powering diesel fuel, which as explained above is delivered, in a per se well known way, during the last part of the compression stroke of the piston of each cylinder, the heat produced from the combustion thereof is converted into mechanical energy by the diesel engine 1, and accordingly only a part of said heat is exhausted in the exhaust gases of the engine. On the other hand, because of the timing of the injection of the purging pulses of diesel fuel, the heat produced from the combustion thereof is not substantially converted into mechanical energy by the diesel engine 1, and accordingly substantially all this heat is vented in the exhaust gases of the engine. Accordingly, these exhaust gases are much hotter than they would be in the case that no purging diesel fuel injection was being performed, relative to the same excess air ratio, i.e. relative to the same operational conditions of the diesel internal combustion engine 1.

Referring again to the flow chart shown in FIG. 3, after the injection of the purging pulses of diesel fuel has been started as described above, the control device 17 enters a loop wherein it checks whether the temperature of the exhaust gases present within the soot catcher 11, as indicated by the output signal of the exhaust gas temperature sensor 19, is greater than a predetermined temperature which exemplarily is shown as being 500° C., or not. If in fact said temperature of the exhaust gases within the soot catcher 11 is less than said predetermined temperature of 500° C., then the control device 17 cycles round the loop; on the other hand, if said temperature of the exhaust gases within the soot catcher 11 is greater than said predetermined temperature of 500° C., then the control device 17 continues to the next step, wherein it starts to measure elapsed time. If the elapsed time measured, from the instant when the control device 17 detects that the temperature of the exhaust gases within the soot catcher 11 is greater than said predetermined temperature of 500° C., then the control device 17 continues to execute a loop, continually testing the current value of said elapsed time.

On the other hand, when said elapsed time becomes equal to or greater than a certain time interval, which exemplarily is shown as being two minutes, then the control device 17, according to the shown algorithm, judges that the accumulation of combustible particles, i.e. soot, which had before been present in the soot catcher 11 has been by now satisfactorily purged. Therefore, the control device 17 starts to send out signals for stopping the supply of purging pulses of diesel fuel from the second or purging fuel injection pump 30; in more detail, the control device 17 sends a "CLOSE" signal to the fuel shut off valve 33 incorporated in said purging fuel injection pump 30, and also sends an electrical signal to the electromagnetic clutch 35, so as to disengage said electromagnetic clutch 35 and so as to cause the crankshaft (not shown) of the internal combustion engine 1 to cease rotating the drive shaft 31 of the purging fuel injection pump 30. Accordingly, fuel ceases to be supplied to the purging fuel injection pump 30, and also the drive shaft 31 thereof ceases to be rotated, and accordingly purging pulses of diesel fuel at high pressure cease to be provided to the fuel injection nozzles $6_1$, $6_2$, $6_3$, and $6_4$. Accordingly, the amount of heat present in the exhaust gases passing through the soot catcher 11 quickly starts to drop. Further, immediately after this step of stopping the supply of purging pulses of diesel fuel, the control device 17 sends out a deactivation signal to the glow plug energization and control device 8, which causes said glow plug energization and control device 8 to stop sending electrical energy to the glow plugs 7, so as to allow them to cool down. Then the control device 17 passes to the next step of the flow chart, in which it stops sending said "CLOSE" signal to the electromagnetic actuator 16 for completely shutting off exhaust gas recirculation, so as to allow the usual per se well known exhaust gas recirculation from the exhaust gas take out port 13 through the exhaust gas recirculation passage 14 and the input port 15 of the exhaust gas recirculation control valve 4 into the intake manifold 5 to recommence. Then, finally, the control device 17 is RESET, i.e. control returns to the start of the flow chart as shown in FIG. 3.

In fact, although it is not particularly so shown in any of the figures because it is not relevant to the principles of the present invention, the control device 17 may also have the function, when the soot catcher 11 is not being purged as described above, of controlling the electromagnetic actuator 16 of the exhaust gas recirculation control valve 4 so as to allow a proper and appropriate amount of exhaust gas recirculation, according to current operational parameters of the internal combustion engine 1, in a per se well known way.

The reason that, even if the soot catcher 11 needs to be purged, no supply is made of purging pulses of diesel fuel if the temperature of the cooling water of the internal combustion engine 1 is below the predetermined value of for example 80° C., is that in this cold operational condition the combustion of fuel may not be complete. And, as mentioned before, the reason for shutting off exhaust gas recirculation during purging of the soot catcher 11 by supply of purging pulses of diesel fuel into the combustion chambers is so as to ensure that the maximum amount of excess air is available within the combustion chambers during the expansion strokes of the pistons thereof, in order to combust these purging pulses of injected diesel fuel as completely as possible.

Figure 4:
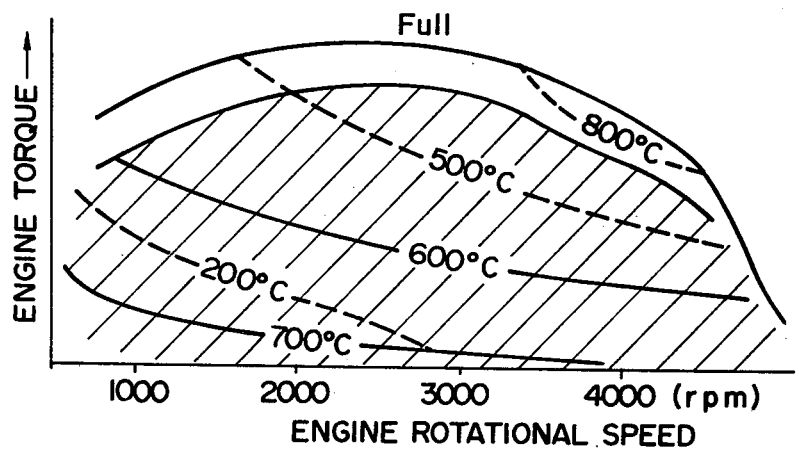
FIG. 4 is a chart, in which engine torque is the ordinate, and engine revolution speed is the abscissa, showing the temperature of the exhaust gases of the diesel engine shown in FIG. 1, for various combinations of engine torque and engine revolution speed, in the practice of the above shown preferred embodiment.

FIG. 4 is a chart showing the temperature of the exhaust gas within the soot catcher 11 for various different combinations of engine revolution speed and engine torque, which are shown as the abscissa and the ordinate respectively. The figures shown in FIG. 4 have been derived by the present inventor by actual experiment. The dotted lines labeled with temperatures in degrees °C. are lines of equal exhaust gas temperature within the soot catcher 11 when no purging pulses of diesel fuel are being injected into the combustion chambers $2_1$, $2_2$, $2_3$, and $2_4$ by the purging fuel injection pump 30, and the solid lines labeled with temperatures in degrees °C. are lines of equal exhaust gas temperature within the soot catcher 11 when purging pulses of diesel fuel are being injected into the combustion chambers $2_1$, $2_2$, $2_3$, and $2_4$ by the purging fuel injection pump 30, as described above, at appropriate timing instants. It will be understood from this chart that, in a relatively low load operational condition of the diesel internal combustion engine 1, if no supply of purging pulses of injected diesel fuel is made by the purging fuel injection pump 30, then the temperature of the exhaust gases within the soot catcher 11 is at a low value of around 200° C., which is not sufficient to purge the soot catcher 11 by combusting the soot particles present therein; but, on the other hand, if in this relatively low load operational condition a supply of purging pulses of injected diesel fuel is made by the purging fuel injection pump 30, then the temperature of the exhaust gases within the soot catcher 11 is at a high value of around 700° C., which is amply adequate for purging the soot catcher 11 by combusting the soot particles present therein. Accordingly the supply of purging pulses of diesel fuel is very helpful in this case for purging the soot catcher 11. On the other hand, in a relatively high load operational condition of the diesel internal combustion engine 1, even if no supply of purging pulses of injected diesel fuel is made by the purging fuel injection pump 30, the temperature of the exhaust gases within the soot catcher 11 is at a high value of around 700° C., which is amply adequate for purging the soot catcher 11 by combusting the soot particles present therein, without the need for any particular steps to be taken for purging said soot catcher 11.

Therefore, according to the first preferred embodiment of the fuel supply method according to the present invention, purging pulses of diesel fuel are only supplied for purging the soot catcher 11, under low to medium load operational conditions of the internal combustion engine 1, when a substantial amount of excess oxygen is present within the combustion chambers thereof to combust said purging pulses of injected diesel fuel. On the other hand, according to this first preferred embodiment, when the diesel engine 1 is being operated under high load conditions, no purging pulses of diesel fuel are ever supplied to the combustion chambers thereof in order to purge the soot catcher 11, because the temperature of the exhaust gases within said soot catcher 11 rises to a high enough value anyway. Thus, the hatched area in FIG. 4 indicates the range of engine operational conditions, according to this first preferred embodiment, in which supply of purging pulses of injected diesel fuel is commanded to be made by the control device 17 from the purging fuel injection pump 30, when it is judged to be desirable to purge the soot catcher 11.

As will be clear from consideration of FIG. 4, when purging pulses of diesel fuel are being supplied according to the first preferred embodiment of the method according to the present invention to the combustion chambers of the internal combustion engine 1 by the purging fuel injection pump 30, the temperature of the exhaust gases decreases according to increase in the load on the engine 1. This is because as the load increases the amount of excess oxygen available in the combustion chambers for combustion of these purging pulses of diesel fuel decreases. The magnitude of the purging pulses of injected diesel fuel, when they are being provided as described above for purging the soot catcher 11, therefore may advantageously be varied so as to increase according to decrease in the load on the internal combustion engine 1, and vice versa, and in fact this amount of purging diesel fuel supplied may be controlled to vary, according to variation in engine load, so that almost all the excess oxygen in the combustion chambers of the engine 1 is utilized for combustion of said purging pulses, for a range of engine load conditions.

Figure 5:
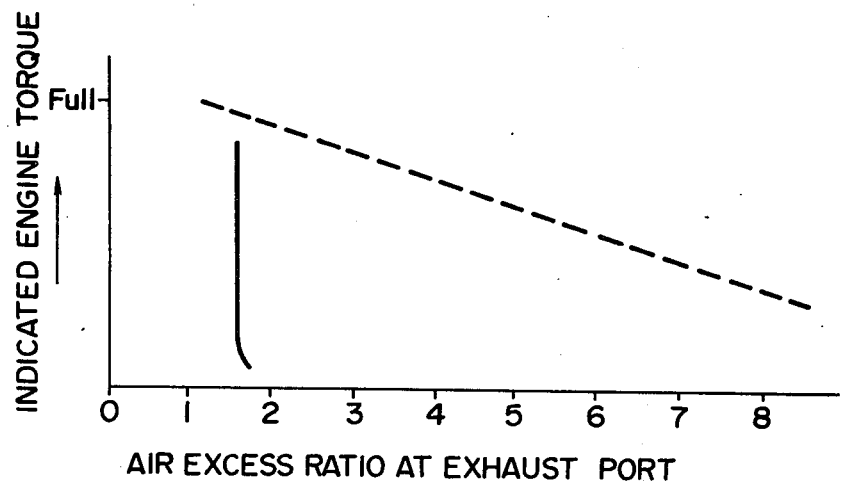
FIG. 5 is a chart, in which indicated torque is the ordinate, and air excess ratio at exhaust ports of the engine is the abscissa, showing the ratio of indicated torque to air excess ratio, in the practice of the above shown preferred embodiment.

FIG. 5 is a chart showing the air excess ratio at the exhaust ports of the combustion chambers $2_1$, $2_2$, $2_3$, and $2_4$ for various different values of indicated engine torque, air excess ratio and indicated torque being shown as the abscissa and the ordinate respectively. The data shown in FIG. 4 have been derived by the present inventor by actual experiment. The dotted line shows the behavior of excess air ratio when no purging pulses of diesel fuel are being injected into the combustion chambers $2_1$, $2_2$, $2_3$, and $2_4$ by the purging fuel injection pump 30, and the solid line shows the behavior of excess air ratio when purging pulses of diesel fuel are being injected into the combustion chambers $2_1$, $2_2$, $2_3$, and $2_4$ by the purging fuel injection pump 30, as described above, at appropriate timing instants, in approximately the right amount for completely using up all the excess oxygen present within the combustion chambers. It will be understood from this chart that, when no supply of purging pulses of injected diesel fuel is being made by the purging fuel injection pump 30 to the combustion chambers $2_1$, $2_2$, $2_3$, and $2_4$, then the excess air ratio decreases steadily with increasing engine load; while further, when a supply of purging pulses of injected diesel fuel is being made by the purging fuel injection pump 30 in order to purge the soot catcher 11, the magnitude of said purging pulses being controlled as described above according to engine load, then almost all the excess oxygen in the combustion chambers of the engine 1 is utilized for combustion of said purging pulses, as is desirable.

The time interval, exemplarily shown in the flow chart of FIG. 3 as two minutes, over which the supply of purging pulses of diesel fuel is continued, after the temperature of the gases in the soot catcher 11 has risen over the predetermined temperature, exemplarily shown as 500° C., is selected so as to be adequate to allow purging of the soot catcher 11 during that time, and should be appropriately selected according to the construction and the capacity of the soot catcher 11, as well as the frequency of purging thereof, determined by the above mentioned predetermined pressure value for the pressure of exhaust gases within the soot catcher 11 which triggers the performance of purging, according to the described operation of the control device 17.

THE SECOND EMBODIMENT

Figure 6:
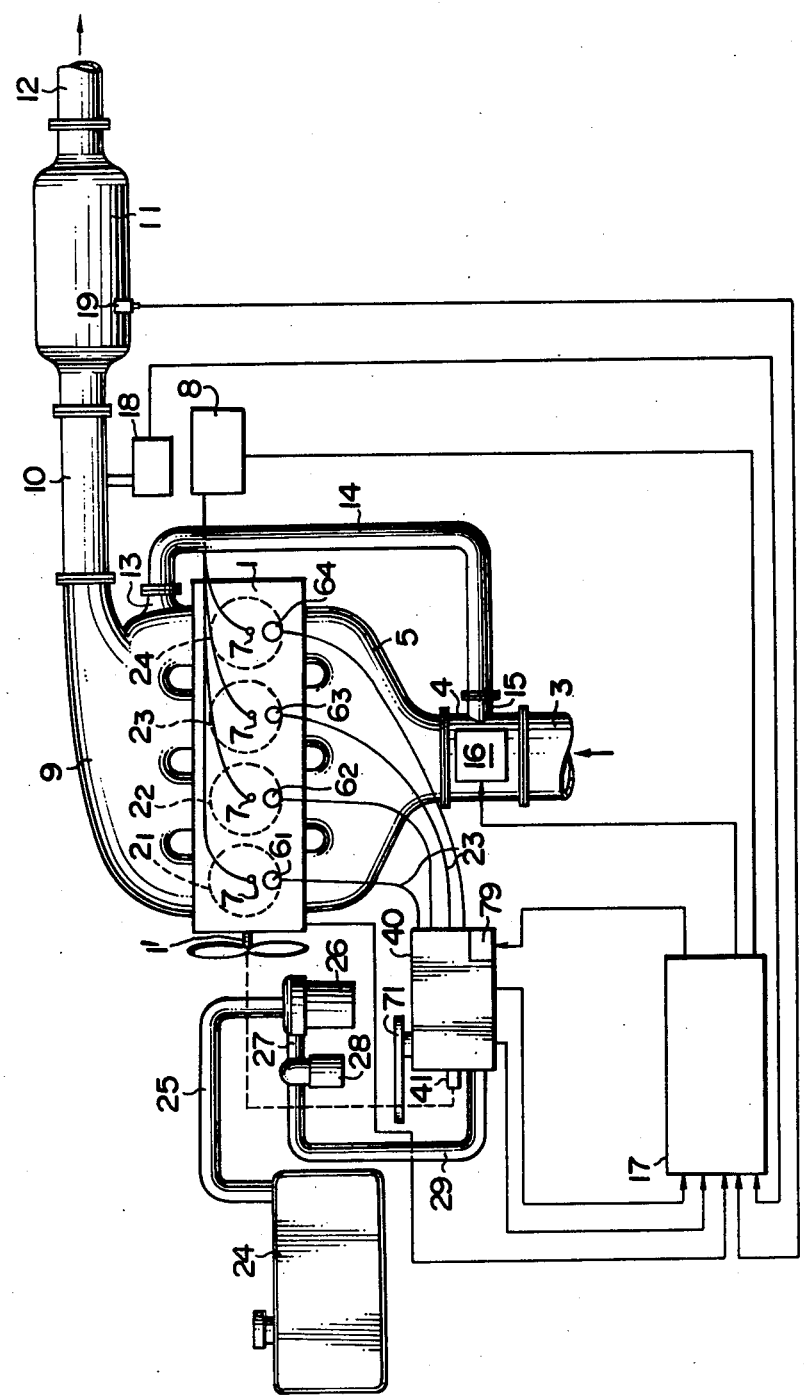
FIG. 6 is a schematic structural view, similar to FIG. 1, showing the general structure of a diesel engine, incorporating a soot particle catcher, which is equipped with a second preferred embodiment of the fuel supply apparatus according to the present invention in which a combined fuel injection pump replaces said first and second fuel injection pumps of the first preferred embodiment, for practicing said preferred embodiment of the fuel supply method according to the present invention.

In FIG. 6, there is shown a second preferred embodiment of the fuel supply apparatus according to the present invention, in a fashion similar to FIG. 1. In FIG. 6, parts of the second preferred embodiment shown, which correspond to parts of the first preferred embodiment shown in FIG. 1, and which have the same functions, are designated by the same reference numerals and symbols as in that figure.

BASIC CONSTRUCTION OF THE SECOND EMBODIMENT

In FIG. 6, again, the reference numeral 1 denotes a diesel internal combustion engine, which is again exemplarily a four cylinder in line type diesel engine, incorporating four combustion chambers $2_1$, $2_2$, $2_3$, and $2_4$. These combustion chambers $2_1$ through $2_4$ suck in air from the atmosphere through, in the following specified order, an air cleaner (not shown in the drawing), an intake tube 3, an exhaust gas recirculation valve 4, and an intake manifold 5 which distributes the air between said combustion chambers $2_1$ through $2_4$, in a per se well known way.

Each of the combustion chambers $2_1$, $2_2$, $2_3$, and $2_4$ is provided with a fuel injection nozzle. These fuel injection nozzles corresponding respectively to these combustion chambers $2_1$, $2_2$, $2_3$, and $2_4$ are designated by the reference numerals $6_1$, $6_2$, $6_3$, and $6_4$, and each of them is adapted to inject a fine spray of diesel fuel at high pressure into its corresponding combustion chamber, in a per se well known way. In the shown exemplary diesel engine 1 the firing order of the cylinders is again 1-3-4-2, and the fuel injection order for the nozzles $6_1$ through $6_4$ is of course the same; in other words, the cyclic order of cylinder operation is: the first cylinder, the third cylinder, the fourth cylinder; the second cylinder; and then the first cylinder again.

Each of the combustion chambers $2_1$, $2_2$, $2_3$, and $2_4$ is provided with a glow plug, all of these four glow plugs being designated by the same reference numeral 7. The supply of electrical energy to all of these glow plugs 7 is provided in parallel from a glow plug energization and control device 8.

Exhaust gases are exhausted from the combustion chambers $2_1$, $2_2$, $2_3$, and $2_4$ of the diesel engine 1 into an exhaust manifold 9, which is communicated in turn to an exhaust pipe 10 which leads to the inlet side of a soot catcher 11, the outlet side of which is connected to a second exhaust pipe 12 which leads to the atmosphere. The soot catcher 11 is again of the above described per se well known sort, which incorporates a filter structure for catching the soot particles present in the exhaust gases passing therethrough. In more detail, the soot catcher 11 is adapted to catch the combustible solid particles such as carbon particles present in the exhaust gases passing therethrough, while allowing substantially free flow of said exhaust gases therethrough. Such a soot catcher 11 may, again, comprise a filter structure including a multi screen element which is made of ceramic or metal held within a casing of stainless steel or other heat resistant material able to withstand the temperature of the hot exhaust gases passing through the soot catcher 11. Again, it is generally preferable to coat such a multi screen element with a catalyst for catalyzing the combustion of combustible materials present in the exhaust gases.

An exhaust gas pressure sensor 18 is provided at an intermediate part of the exhaust pipe 10, upstream of the soot catcher 11, and an exhaust gas temperature sensor 19 is provided to said soot catcher 11 for sensing the temperature of the exhaust gases present within said soot catcher 11. At an intermediate part of the exhaust manifold 9 there is provided an exhaust gas take out port 13 for allowing a part of the exhaust gases of the internal combustion engine 1 within said exhaust manifold 9 to pass therethrough in order to recirculate said exhaust gases, so as to provide EGR. This exhaust gas take out port 13 is communicated, via an exhaust gas recirculation passage 14, to the input port 15 of the previously mentioned exhaust gas recirculation control valve 4. This exhaust gas recirculation control valve 4 comprises a valve element, not shown in the drawing, which controls the amount of exhaust gas recirculation which is permitted through said exhaust gas recirculation control valve 4. In other words, this valve element controls the effective gas flow resistance of the exhaust gas recirculation control valve 4. The valve element is driven to and fro by an electromagnetic actuator 16. And the activating electrical energy for this electromagnetic actuator 16 as well as a control signal for the glow plug energization and control device 8 are selectively provided from a control device 17 which will be explained in more detail later. Further, the output electrical signals from said exhaust gas pressure sensor 18 and from said exhaust gas temperature sensor 19 are supplied to said control device 17, as will also be explained in more detail later.

Both powering fuel injection and purging fuel injection to the diesel internal combustion engine 1 are provided from a combined fuel injection pump 40 of a novel sort, which will now be described, first with regard to its function and then with regard to its structure. This combined fuel injection pump 40 is provided for injecting fuel into the combustion chambers $2_1$, $2_2$, $2_3$, and $2_4$, and in fact is an improvement over the per se well known Bosch type VE fuel injection and distribution pump. The combined fuel injection pump 40, which is more fully shown in FIGS. 7 and 8, and which will be described in detail later with reference to those figures, comprises: a drive shaft 41 which is rotated by the crankshaft (not shown) of the diesel internal combustion engine 1 at half crankshaft speed, i.e. camshaft speed, and which is maintained in a predetermined definite rotational phase relationship with respect to said crankshaft, as schematically shown in FIG. 6 by the dashed line; a fuel supply pump 42, not shown in FIG. 6 but shown in FIG. 7, which is rotated by the drive shaft 41 and which sucks in fuel from a fuel tank 24, through a fuel conduit 25, through a fuel/water separator 26, through another fuel conduit 27, through a fuel filter 28, and through a third fuel conduit 29, in that order, into the interior of the casing of the combined fuel pump 40; and a fuel metering and distribution system which supplies metered powering pulses of diesel fuel at high pressure at correct timing points to be injected into the four combustion chambers $2_1$, $2_2$, $2_3$, and $2_4$, as will be more fully described later. The amount of each of these powering pulses of injected diesel fuel is determined by said fuel metering and distribution device in such a way that it increases according to increase in the load on the diesel internal combustion engine 1, as will be explained in detail with regard to the description of the construction of the combined fuel pump 40. Functionally, the magnitude of each of these powering pulses of diesel fuel is determined in relation to the rotational angle of a control lever 71—which is fixed to a rotatable shaft of the combined fuel injection pump 40, and which is turned by a linkage, not shown in the drawing, which connects its extremity to an accelerator pedal of the vehicle (also not shown in the drawing) in a per se well known way—and also in relation to the action of a govenor of a per se well known sort, incorporated in the combined fuel injection pump 40, and not shown in FIG. 6 but shown in FIG. 7 and denoted therein by the reference numeral 70. Thus the amount of diesel fuel injected to each of the combustion chambers $2_1$, $2_2$, $2_3$, and $2_4$, in each powering pulse, is controlled according to the amount of depression of said accelerator pedal, and also according to the speed of rotation of said drive shaft 41 of said combined fuel injection pump 40, and increases with increase in engine load.

The combined fuel injection pump 40 is connected to the fuel injection nozzles $6_1$, $6_2$, $6_3$, and $6_4$ through four fuel distribution conduits, which are all designated in FIG. 6 by the same reference numeral 23, so as to send said metered powering pulses of diesel fuel thereto. The timing instant of commencement of injection of the powering pulse of diesel fuel to each of the fuel injection nozzles $6_1$, $6_2$, $6_3$, and $6_4$ by the combined fuel injection pump 40 is so arranged that the corresponding piston (not shown) of the corresponding combustion chamber $2_1$, $2_2$, $2_3$, and $2_4$ at said powering pulse commencement instant is at a first timing position at which fuel injection into said combustion chamber is effective for converting thermal energy resulting from the subsequent combustion of said fuel into mechanical energy, i.e. into engine work output. In other words, the time instant of commencement of the fuel injection powering pulse into each one of the combustion chambers $2_1$, $2_2$, $2_3$, and $2_4$ is during the last part of the compression stroke of the piston corresponding to said combustion chamber. This is of course the per se well known timing for such powering diesel fuel injection into a diesel engine. The combined fuel injection pump 40 is as a matter of course always activated to provide these powering pulses of diesel fuel during operation of the internal combustion engine 1, in order to provide the diesel fuel required for said operation.

Further, the combined fuel injection pump 40 incorporates a solenoid device 79, which is selectively supplied with actuating electrical energy from the control device 17 as will be more fully explained later. When this solenoid is supplied with activating electrical energy by the control device 17, then the combined fuel injection pump 40, as well as supplying the above mentioned metered powering pulses of injected diesel fuel to the internal combustion engine 1, also supplies metered purging pulses of diesel fuel at high pressure at correct timing points through the same fuel distribution conduits 23 to the four combustion chambers $2_1$, $2_2$, $2_3$, and $2_4$, the amount of fuel supplied in each of these purging pulses of injected diesel fuel being determined in such a way that it decreases according to increase in the load on the diesel internal combustion engine 1. In more detail, the amount of fuel supplied in each of these purging pulses of injected diesel fuel is determined in relation to the rotational angle of the control lever 71 of the combined fuel injection pump 40, as will be explained later. Thus the amount of fuel supplied to each of the combustion chambers $2_1$, $2_2$, $2_3$, and $2_4$, in each purging pulse, is controlled so as to decrease with increase in engine load.

The time instant of commencement of the fuel injection purging pulse from the combined fuel injection pump 40 to each of the fuel injection nozzles $6_1$, $6_2$, $6_3$, and $6_4$ is so arranged that the corresponding piston (not shown) of the corresponding combustion chamber $2_1$, $2_2$, $2_3$, and $2_4$ at said purging pulse commencement instant is in a second timing position at which fuel injection into said combustion chamber is not substantially effective for converting thermal energy resulting from the subsequent combustion of said fuel into mechanical energy, i.e. engine work output; so that substantially all of said thermal energy is released as heat in the exhaust gases which pass into the exhaust system of the internal combustion engine 1. The time instant of commencement of the purging fuel injection pulse into each of the combustion chambers $2_1$, $2_2$, $2_3$, and $2_4$, when supplied, again in this second preferred embodiment also may be during the last part of the expansion stroke of the piston corresponding to said combustion chamber. The combined fuel injection pump 40 is of course always, during the operation of said diesel internal combustion engine 1, activated to provide the powering pulses of diesel fuel required for powering operation of said engine 1, but is only selectively activated to provide the purging pulses of diesel fuel required for purging operation, as will be explained later, according to the selective energization of said solenoid device 79.

DETAILED STRUCTURE OF THE COMBINED FUEL INJECTION PUMP

Now, the detailed structure of the combined fuel injection pump 40 will be explained, with particular reference to FIGS. 7 and 8. In these figures, parts of the combined fuel injection pump 40 shown which correspond to parts thereof shown in FIG. 6 are designated by the same reference numerals and symbols as in that figure.

As mentioned earlier, this combined fuel injection pump 40 is an improvement over the per se well known Bosch type VE fuel injection and distribution pump. The pump 40 comprises a casing 44 and a drive shaft 41 which is rotated by the crankshaft of the internal combustion engine 1 in a predetermined definite rotational phase relationship therewith. In fact the drive shaft 41 is rotated at half crankshaft speed, i.e. at camshaft speed, because the shown internal combustion engine 1 is a four stroke diesel engine. This drive shaft 41 drives a fuel supply pump 42 of a per se well known sort which supplies diesel fuel sucked in through a fuel inlet port 43 into a chamber 45 defined within the casing 44, said chamber 45 being communicated with another chamber 76 defined within the casing 44 via an aperture 82 formed through the wall 68 which divides between said chambers 76 and 45.

The drive shaft 41 is rotationally fixedly connected to a cylindrical pump plunger 47, which however is free to move with respect to the drive shaft 41 to a certain extent in the left and right directions as seen in FIG. 7, along its axial direction and that of the drive shaft 41; this connection is implemented by the provision of a coupling 48, the constructional details of which are not shown in the figures or described further herein because they are per se well known and conventional. The pump plunger 47, according to its rotation along with the drive shaft 41, is moved to and fro in the left and right directions as seen in FIG. 7 by the movement of a circular cam plate 49 against a cam roller 50, said pump plunger 47 being biased to the left in the figure by a compression coil spring 51; again, the details of this biasing construction are not shown in the figures or described further herein because they are per se well known, conventional, and obvious. The right hand end in FIG. 7 of the pump plunger 47, i.e. its end remote from the drive shaft 41, which will hereinafter be called its piston end, is inserted into and closely cooperates with a central axial cylindrical hole formed in a sleeve 46 which is fixed to the casing 46 coaxially with said pump plunger 47 and said drive shaft 41, the other end of said cylindrical hole being closed by a bleed screw 100.

Along the central axis of the pump plunger 47, from its piston end to an intermediate position therealong, there is pierced a central passage 56. From this central axial passage 56 there open the following radial passages, which extend from said central passage 56 to the outer cylindrical surface of the pump plunger 47, as follows spaced in order from the left to the right of FIG. 7: a first spill port passage 59, a second spill port passage 60; a third spill port passage 61; and main and sub outlet ports 57 and 58. In fact, each of the first, second, and third spill ports 59, 60, and 61 is provided as a plurality of radially extending passages which are located at the same axial position along the central axis of the pump plunger 47 but which are circumferentially displaced from one another, so as to protect against possible problems due to blockage of any of said spill ports 59, 60, and 61; but this is not essential or particularly important to the present invention. Further, the main and the sub outlet ports 57 and 58 also are located at the same axial position as one another along said central axis of the pump plunger 47 but are circumferentially displaced from one another by a certain angle, and this is an important feature of the shown construction of the combined fuel injection pump 40. The main outlet port 57 and the sub outlet port 58 are best seen in FIG. 8, which is a section taken through the pump plunger 47 perpendicular to its central axis at the same axial position as said main and sub outlet ports 57 and 58 and through the sleeve 46 at an somewhat different axial position thereof which shows the four distribution ports $62_1$, $62_2$, $62_3$, and $62_4$ and the four fuel distribution passages $63_1$, $63_2$, $63_3$, and $63_4$ (all of which are to be described later), and as seen in this figure the outer circumferential surface of the pump plunger 47, at its parts where the main outlet port 57 and the sub outlet port 58 open to it, is formed with dimples 57' and 58' respectively. Finally, the piston end of the pump plunger 47, at its part to the right in the figure of the main and sub outlet ports 57 and 58, is formed with four axially extending grooves 52 thereon, spaced equidistantly from one another around its circumference. There are provided four of the grooves 52 because of the provision of the four combustion chambers $2_1$, $2_2$, $2_3$, and $2_4$, and in another application of this combination fuel injection pump 40 in which there was a different number of combustion chambers for the internal combustion engine 1 a correspondingly different number of such grooves 52 would be provided.

The sleeve 46 is formed, as can be seen in the section shown in FIG. 7, with a transfer port 53 which extends from its inner cylindrical surface to its outer cylindrical surface, where said transfer port 53 communicates with a passage 54 formed in the casing 44 of the combination fuel injection pump 40 which communicates with the internal space 45, which as mentioned above is filled with diesel fuel by the pump 42. Further, the sleeve 46 is formed with four distribution ports $62_1$, $62_2$, $62_3$, and $62_4$ at the same position along the axial direction thereof and spaced equidistantly from one another around its circumference, each of which communicates respectively with a corresponding fuel distribution passage $63_1$, $63_2$, $63_3$, and $63_4$ formed in the pump casing 44. Each of the fuel distribution passages $63_1$, $63_2$, $63_3$, and $63_4$ communicates with the input side of one of four one way delivery valves 64 (only one of which is shown in FIG. 7), each of the output sides of said one way delivery valves 64 communicating via its one of four nipples formed on the casing 44 of the pump 40 with one of the previously mentioned four fuel distribution conduits 23 which lead to the fuel injection nozzles $6_1$, $6_2$, $6_3$, and $6_4$ fitted to the combustion chambers $2_1$, $2_2$, $2_3$, and $2_4$ respectively.

Thus, as the pump plunger 47 moves to and fro in the left and right directions in FIG. 7 while simultaneously rotating at half crankshaft speed around its central axis, the piston end thereof plunges into and moves out of the axial central hole in the sleeve 46 while rotating. As said piston end moves out of said axial central hole in the sleeve 46, as soon as one of said grooves 52 engages with and corresponds to the transfer port 53, diesel fuel is sucked in from the passage 54 through the transfer port 53 along said groove 52 into the pump chamber 55 defined at the end of the piston end of the pump plunger 47, between it and the previously mentioned bleed screw 100, because said pump chamber 55 is expanding in volume. When, on the other hand, said piston end of said pump plunger 47 plunges into said axial central hole of the sleeve 46, as soon as said one of said grooves 52 disengages from and ceases to correspond to the transfer port 53, the diesel fuel within the pump chamber 55 is squeezed, because said pump chamber 55 is contracting in volume. The positions of the various apertures and ports and of three spill rings 66, 67, and 69, etc., as will be explained in detail later, at all times are such that when none of the first, second, or third spill ports 59, 60, or 61 is opened, i.e. when the central axial passage 56 of the pump plunger 47 is completely blocked off to the leftward flow of diesel fuel therethrough, then always either the main outlet port 57 or the sub outlet port 58 is engaged with and is corresponding to one of the four distribution ports $62_1$, $62_2$, $62_3$, and $62_4$ via its respective dimple 57' or 58'; and therefore there is no possibility of said squeezed diesel fuel within the contracting pump chamber 55 not finding an outlet. In fact, since the one way delivery valves 64 have a certain resistance to flow of fuel even in their permitted flow directions, the squeezed diesel fuel in the chamber 55 is ejected, via the main outlet port 57 or the sub outlet port 58 and the one of the distribution ports $62_1$, $62_2$, $62_3$, and $62_4$ which currently is engaged to and corresponding to the dimple 57' or the dimple 58', when and only when all of the first, second, and third spill ports 59, 60, and 61 are closed, causing pressure to build up in the pump chamber 55. Thus, the exact timings of starting and stopping of injective supply of diesel fuel to the various fuel injection nozzles $6_1$, $6_2$, $6_3$, and $6_4$ of the combustion chambers $2_1$, $2_2$, $2_3$, and $2_4$ are determined by the instants at which the various spill ports 59, 60, and 61 are closed up, and are opened, by members which controllingly obstruct them. The details of these obstructing members will now be explained.

The pump plunger 47 passes through a circular hole formed in the wall 68 which separates the chamber 45 from the chamber 76, within the pump casing 44, and the inner cylindrical surface 101 of this hole closely cooperates with the outer cylindrical surface of the pump plunger 47. On the part of the pump plunger to the left in FIG. 7 of the wall 68 there are slidably mounted a first spill ring 66 and a second spill ring 67, the inner cylindrical surfaces of these first and second spill rings 66 and 67 closely cooperating with the outer cylindrical surface of said pump plunger 47, and on the part of the pump plunger to the right in FIG. 7 of the wall 68 there is slidably mounted a third spill ring 69, the inner cylindrical surface of said third spill ring 69 again closely cooperating with the outer cylindrical surface of said pump plunger 47. The positions of the pump plunger 47 and of the first, second, and third spill ports 59, 60, and 61 wherein they are displaced to their extreme rightwards positions in the figure are shown in FIG. 7 by the solid lines, and the positions of said first, second, adn third spill ports 59, 60, and 61 wherein they are displaced to their extreme leftwards positions in FIG. 7 are shown by the dashed lines. As the pump plunger 47 moves to and fro to the left and the right in the figure, the first spill port 59 is opened and closed by its cooperation with the first spill ring 66, the second spill port 60 is opened and closed both by its cooperation with the second spill ring 67 and its cooperation with the inner surface 101 of the hole in the wall 68, and the third spill port 61 is opened and closed by its cooperation with the third spill ring 69, the exact instants of these openings and closings of the first, second, and third spill ports being determined by the axial positions of the first, second, and third spill rings 66, 67, and 69.

The first spill ring 66 is moved to and fro in the axial direction of the pump plunger 47, i.e. to the left and right in FIG. 7, by the movement of the previously described control lever 71, via a governor device 70 of a per se well known sort. As the accelerator pedal (not shown) of the vehicle to which this combined fuel injection pump 40 is fitted is depressed more and more, the governor device moves the first spill ring 66 more and more to the right in FIG. 7. As will be explained in detail later, the more to the right is the position of the first spill ring 66, the later is the timing of the instant of cessation of the powering pulses of diesel fuel, which are supplied to the combustion chambers $2_1$, $2_2$, $2_3$, and $2_4$ when the pistons corresponding to these chambers are in the latter parts of their compression strokes, and this means that the more the accelerator pedal of the vehicle is depressed the greater is the total magnitude of each of these powering pulses of diesel fuel injection; in other words, the magnitude of the powering pulses of injected diesel fuel increases with increasing engine load, as of course is proper.

The second spill ring 67 is moved to and fro in the axial direction of the pump plunger 47, i.e. to the left and right in FIG. 7, by the movement of the upper end in the figure of a lever 73. The central part of this lever 73 is pivoted at a pivot 72, and the lower end in the figure of the lever 73 is coupled to the movement of the first spill ring 66 by a link 74 and a fixed link 75. Thus, the movement of the second spill ring 67 is coupled to the movement of the previously described control lever 71, and as the acclerator pedal (not shown) of the vehicle to which this combined fuel injection pump 40 is fitted is depressed more and more, i.e. as the first spill ring 66 moves more and more to the right in FIG. 7, the lever 73 moves the second spill ring 67 more and more to the left in FIG. 7. As will be explained in detail later, the more to the left is the position of the second spill ring 67, the earlier is the timing of the instant of cessation of the purging pulses of diesel fuel, which are selectively supplied to the combustion chambers $2_1$, $2_2$, $2_3$, and $2_4$ at the time points when the pistons corresponding to these chambers are in the latter parts of their expansion strokes, when the soot catcher 11 is being purged. This means that the more the accelerator pedal of the vehicle is depressed the less is the total magnitude of each of these purging pulses of diesel fuel injection, when they are supplied; in other words, the magnitude of the purging pulses of injected diesel fuel decreases with increasing engine load. This relationship as explained above is a desirable one.

The third spill ring 69 is moved to and fro in the axial direction of the pump plunger 47, i.e. to the left and right in FIG. 7, by the movement of the upper end in the figure of a lever 78. The central part of this lever 78 is pivoted at a pivot 77, and the other end of the lever 78 is coupled to the solenoid 80 of a solenoid device 79, which has been previously mentioned with regard to its function. Thus, the third spill ring 69 is displaced to its leftmost position as shown in FIG. 7, wherein it abuts against the wall 68, when and only when the solenoid device 79 is supplied with actuating electrical energy, which is done when it is desired to purge the soot catcher 11. On the other hand, when it is not desired to purge the soot catcher 11, then no actuating electrical energy is supplied to the solenoid device 79, and then under the action of a compression coil spring or the like not shown in the figure the third spill ring 69 is moved to the right in FIG. 7, so as to rest against the stopper member 83. This stopper member 83 is connected to the solenoid of a second solenoid device 84, which is only shown in FIG. 7 by phantom lines, and which when supplied with actuating electrical energy maintains the stopper member 83 at its leftwardly displaced position as shown in FIG. 7 by the solid lines. On the other hand, when the second solenoid device 84 is not supplied with actuating electrical energy, then it maintains the stopper member 83 in its rightwardly displaced position as shown in FIG. 7 by the phantom lines. This second solenoid device 84 is supplied with actuating electrical energy from the ON switch (not shown), i.e. the key switch, for the diesel internal combustion engine 1, and accordingly the stopper member 83 is only in its position shown by phantom lines when the internal combustion engine 1 is switched off. As will be explained in detail later, when the third spill ring 69 is in its position to the extreme right in FIG. 7, abutting against the stopper member 83 which is in the above mentioned rightwardly displaced position as shown by phantom lines according to the switching OFF of the diesel internal combustion engine 1, then no fuel injection is provided either of powering pulses or of purging pulses of diesel fuel into the combustion chambers $2_1$, $2_2$, $2_3$, and $2_4$; when the third spill ring 69 is in its position somewhat to the right in FIG. 7, abutting against the stopper member 83 which is in the above mentioned leftwardly displaced position as shown by the solid lines according to the switching ON of the diesel internal combustion engine 1, then fuel injection is provided of powering pulses of diesel fuel into the combustion chambers $2_1$, $2_2$, $2_3$, and $2_4$, but no fuel injection is provided of purging pulses of diesel fuel into the combustion chambers $2_1$, $2_2$, $2_3$, and $2_4$; and, when the third spill ring 69 is in its position to the extreme left in FIG. 7 as shown in that figure, abutting against the wall 68 and out of contact with the stopper member 83, according to the supplying of actuating electrical energy to the solenoid device 79, then fuel injection is provided both of powering pulses and of purging pulses of diesel fuel into the combustion chambers $2_1$, $2_2$, $2_3$, and $2_4$.

OPERATION OF THE COMBINED FUEL INJECTION PUMP

Now the operation of this combined fuel injection pump 40 will be explained. As previously stated, the pump plunger 47 reciprocates to and fro along its central axial line in the left to right direction in FIG. 7 while rotating around said central axial line, according to the shape, not shown, of the cam plate 49, and according to the rotation of the crankshaft of the internal combustion engine 1, to which said input shaft 41 rotationally coupled to said pump plunger 47 is geared at a gear reduction ratio of two to one. Considering the motion of said pump plunger 47 from its state wherein it is in its extreme rightmost position as shown in FIG. 7, so that the pump chamber 55 is at its minimum volume, with said pump plunger 47 at a certain rotational orientation which as will be seen later is the correct orientation for providing a powering pulse of injected diesel fuel for the first combustion chamber and possibly a purging pulse of injected diesel fuel for the second combustion chamber (description of the operation in the other three possible cases will be identical to the following description, except cyclically altered according to the above mentioned rotation of the pump plunger 47 about its central axial line, i.e. mutatis mutandis according to the firing order of the shown diesel engine 1 or 1-3-4-2): as said pump plunger 47 moves to the left in FIG. 7 and rotates at the same time, the piston end of the pump plunger 47 moves to the left in the axial central hole in the sleeve 46, and a one of the four grooves 52 comes to oppose and correspond to the transfer port 53, and then diesel fuel is sucked in from the passage 54 through the transfer port 53 along said groove 52 into the pump chamber 55 defined between the piston end of the pump plunger 47 and the bleed screw 100, because said pump chamber 55 is expanding in volume, and because at this time neither the main output port 57 nor the sub output port 58 corresponds to and opposes any one of the distribution ports $62_1$, $62_2$, $62_3$, or $62_4$. Further, at various parts of this intake stroke wherein the pump chamber 55 is expanding one or more of the first, second, and third spill ports 59, 60, and 61 may be opened by its blocking member such as a spill ring and may be communicated to the chamber 45 or the chamber 76; if and when this occurs, since both these chambers 45 and 76 are filled with diesel fuel, this diesel fuel also will enter into the pump chamber 55, flowing rightwards in the figure through the central axial hole 56 in the pump plunger 47. Thus, the intake stroke of the pump plunger 47 proceeds until the pump plunger 47 is at its extreme leftwards position as seen in FIG. 7, with the pump chamber 55 at its maximum volume, in which state the aforesaid groove 52 is moved out of correspondence with and opposition to with said transfer port 53, so that none of said grooves 52 opposes the transfer port 53 and said transfer port 53 is closed. In this state, the first spill port 59, the second spill port 60, and the third spill port 61 are in their positions as shown by the dashed lines in FIG. 7. Thereafter, the pump plunger 47 starts to move to the right as seen in FIG. 7, while still rotating, so as to commence its compression stroke.

OPERATION WHEN THE ENGINE IS SWITCHED OFF

Now, in the event that the key switch for the internal combustion engine 1 is switched off, then both the solenoid device 79 and the solenoid device 84 will be in a state of not being supplied with activating electrical energy, and accordingly the stopper 83 will be in its rightwardly displaced position as shown by the phantom lines in the figure, and the third spill ring 69 will be in its extreme rightmost position, abutting against and contacting said stopper 83. In this state, the third spill port 61 is left unblocked by the third spill ring 69 during all of the rightwards or compression stroke of the pump plunger 47, and accordingly no supply whatever of diesel fuel is provided by the fuel injection pump 40 to the diesel injection nozzles $61_1$, $62_2$, $63_3$, and $64_4$, at any timing point of the engine 1, since diesel fuel compressed within the pump chamber 55 all easily escapes to the chamber 76 via the central axial hole 56 and the third spill port 61. Thus the diesel engine 1 is quickly stopped from operating. This case will not henceforward be further considered here, and therefore it will be hereinafter assumed that the solenoid device 84 is energized and thus that the stopper 83 is in its leftwardly displaced position as shown in the figure by the solid lines.

OPERATION WHEN THE SOOT CATCHER IS NOT BEING PURGED

First, suppose that the solenoid device 79 is not being supplied with actuating electrical energy, i.e. that is not currently being decided by the control device 17 that purging of the soot catcher 11 should currently be performed. In this case, the third spill ring 69 will be in its position as displaced somewhat rightwards from its position as shown in FIG. 7, and will be in abutting contact with the stopper 83 which is in its leftwardly displaced position as indicated in the figure by the solid lines. In this position the third spill ring 69 leaves the third spill port 61 open while the pump plunger 47 is in the state of having moved to the right from its extreme leftward position as seen in FIG. 7 by less than a first predetermined distance, and closes the third spill port 61 when the pump plunger 47 has moved to the right from its extreme leftward position as seen in FIG. 7 by more than said first predetermined distance.

Now, as the pump plunger 47 starts to move rightwards as seen in FIG. 7 from its extreme leftward position, at first, until said pump plunger 47 has moved to the right from its extreme leftward position as seen in FIG. 7 by more than said first predetermined distance, no squeezing of diesel fuel occurs in the pump chamber 55, since as mentioned above said third spill port 61 is left open by said third spill ring 69. During this time, the sub output port 58 is opposing and corresponding to the distribution port $62_2$ for the second combustion chamber $2_2$ via its dimple 58', but since no substantial pressure is being generated in the pump chamber 55 at this time no fuel injection is provided for the fuel injection nozzle $6_2$ of the second combustion chamber $2_2$ via the distribution port $62_2$, the fuel distribution passage $63_2$, the corresponding one way delivery valve 64, and the corresponding fuel distribution conduit 23. This timing period corresponds to the last part of the expansion stroke of the piston of said second combusion chamber $2_2$.

When the pump plunger 47 reaches its position as displaced from its extreme leftward position as seen in FIG. 7 by said first predetermined distance, then said third spill port 61 comes to be closed by said third spill ring 69. At this time the second spill port 60 has already come to be closed by engaging with the inner surface 101 of the aperture in the wall 68 through which the pump plunger 47 passes, quite independently of the position of the second spill ring 67. Thereafter, from this position as the pump plunger 47 moves to the right in the figure, squeezing of diesel fuel in the pump chamber 55 occurs until the first spill port 59 moves out to the right in FIG. 7 from the central aperture of the first spill ring 66 and comes to be unblocked by the inner peripheral surface of said central aperture of said first spill ring 66. During this time period, the main output port 57 is opposing and corresponds to the distribution port $62_1$ for the first combustion chamber $2_1$ via its dimple 57', and since substantial pressure is being generated in the pump chamber 55 at this time a pulse of diesel fuel injection is provided for the fuel injection nozzle $6_1$ of the first combustion chamber $2_1$ via the distribution port $62_1$, the fuel distribution passage $63_1$, the corresponding one way delivery valve 64, and the corresponding fuel distribution conduit 23. The timing of this fuel injection pulse corresponds to the last part of the compression stroke of the piston of the first combustion chamber $2_1$, and thus this pulse of diesel fuel injection serves as a powering pulse of fuel, heat resulting from the combustion of which is substantially converted to mechanical work in the first combustion chamber $2_1$ so as to rotate the crankshaft of the internal combustion engine 1.

As will be readily understood, the amount of fuel delivered in this powering pulse of diesel fuel is determined by the position of the first spill ring 66. In more detail, the speed of delivery of diesel fuel in this injection is of course predetermined by the construction and dimensions of the parts of the pump 40 and is fixed and constant, and therefore the total amount of fuel delivered in the powering pulse is determined by the time interval over which said powering pulse is provided. The instant of starting of the powering pulse is as stated above the instant when the pump plunger 47 reaches its position as displaced from its extreme leftward position as seen in FIG. 7 by said first predetermined distance, when the third spill port 61 comes to be closed by the third spill ring 69, and is therefore fixed and predetermined by the position of the stopper 83 and the thickness of the third spill ring 69, etc.; and therefore the time interval over which the powering pulse of fuel injection is provided is determined only by the timing of the instant of its cessation, which is as stated above the instant when the first spill port 59 moves out to the right in FIG. 7 from the central aperture of the first spill ring 66 and comes to be unblocked by the inner peripheral surface of said central aperture of said first spill ring 66. This instant is thus determined by the axial position of said first spill ring 66, which as stated above is moved to and fro in the axial direction of the pump plunger 47 by the movement of the control lever 71, via the governor device 70, with the governor device 70 moving the first spill ring 59 more to the right in FIG. 7, the more the accelerator pedal of the vehicle is depressed. Of course, the more the first spill ring 66 is moved to the right in FIG. 7, the later is said instant when the first spill port 59 moves out to the right in FIG. 7 from the central aperture of the first spill ring 66 and comes to be unblocked by said first spill ring 66, i.e. the later is the instant of cessation of the powering pulse of injected diesel fuel. Thus, the greater is the depression of the accelerator pedal, the greater is the total magnitude of each of these powering pulses of diesel fuel injection; in other words, the magnitude of the powering pulses of injected diesel fuel increases with increasing engine load, as is appropriate.

OPERATION WHEN THE SOOT CATCHER IS BEING PURGED

On the other hand, suppose that the solenoid device 79 is being supplied with actuating electrical energy, i.e. that it is currently being decided by the control device 17 that purging of the soot catcher 11 should currently be performed. In this case, the third spill ring 69 will be in its extreme leftwards position as shown in FIG. 7, and will be in abutting contact with the wall 68, and in this state the third spill ring 69 always closes the third spill port 61. Thus, the venting action of the third spill port 61 is not available and is irrelevant in this operational mode.

Now, as the pump plunger 47 starts to move rightwards as seen in FIG. 7 from its extreme leftward position, at first both the first spill port 59 is closed by the first spill ring 66 and also the second spill port 60 is closed by the second spill ring 67. Therefore the diesel fuel within the pump chamber 55 is squeezed and pressure is built up in said pump chamber 55. At this time, the sub output port 58 is opposing and corresponding to the distribution port $62_2$ for the second combustion chamber $2_2$ via its dimple 58', and since substantial pressure is being generated in the pump chamber 55 at this time (i.e., as soon as the pump plunger 47 starts to move rightwards as seen in FIG. 7) a pulse of fuel injection immediately starts to be provided for the fuel injection nozzle $6_2$ of the second combustion chamber $2_2$ via the distribution port $62_2$, the fuel distribution passage $63_2$, the corresponding one way delivery valve 64, and the corresponding fuel distribution conduit 23. The timing of this starting of this pulse of fuel injection corresponds to the last part of the expansion stroke of the piston of said second combustion chamber $2_2$, and thus this pulse of diesel fuel injection does not substantially serve as a powering pulse of fuel, heat resulting from the combustion of which is substantially converted to mechanical work in the second combustion chamber $2_2$ so as to rotate the crankshaft of the internal combustion engine 1, but on the other hand this pulse of diesel fuel injection does serve as a purging pulse of diesel fuel, heat resulting from the combustion of which is not substantially converted to mechanical work in the second combustion chamber $2_2$ but is released to the exhaust system of the internal combustion engine 1 in the exhaust gases thereof which pass into the soot catcher 11 so as to heat it up, as described above, and so as to purge said soot catcher 11.

When the pump plunger 47 reaches a position displaced from its extreme leftward position as seen in FIG. 7 by a distance which depends upon the position of said second spill ring 67, then said second spill port 60 comes out of the central axial hole of said second spill ring 67, and thus said second spill port 60 is opened to the chamber 45, thus venting the pump chamber 55. Thus, the injection of the purging pulse of diesel fuel to the second combustion chamber $2_2$ is terminated at this time instant.

As will be readily understood, the amount of fuel delivered in this purging pulse of diesel fuel is determined by the position of the second spill ring 67. In more detail, the speed of delivery of diesel fuel in this purging pulse is of course as before predetermined by the construction and dimensions of the parts of the pump 40 and is fixed and constant, and therefore the total amount of fuel in the purging pulse is determined by the time interval over which the purging pulse is provided. The time of starting of the purging pulse is as stated above determined as being the instant when the pump plunger 47 starts to move rightwards in FIG. 7 from its extreme leftmost position, and is therefore fixed and predetermined. Therefore the time interval over which the purging pulse of fuel injection is provided is determined only by the timing of the instant of its cessation, which is as stated above the instant when the second spill port 60 moves out to the right in FIG. 7 from the central aperture of the second spill ring 67 and comes to be unblocked by the inner peripheral surface of said central aperture of said second spill ring 67. This instant is thus determined by the axial position of said second spill ring 67, which as stated above is moved to and fro in the axial direction of the pump plunger 47, i.e. to the left and right in FIG. 7, by the movement of the linkage which includes the lever 73, the link 74 and the fixed link 75, which couple the movement of the second spill ring 67 to the movement of the first spill ring 66 in a reversed fashion. Thus, the movement of the second spill ring 67 is coupled to the movement of the previously described control lever 71, and as the accelerator pedal (not shown) of the vehicle to which this combined fuel injection pump 40 is fitted is depressed more and more, the second spill ring 60 is moved more and more to the left in FIG. 7. The more to the left is the position of the second spill ring 60, the earlier is the timing of the instant of cessation of the purging pulse of diesel fuel, which means that the more the accelerator pedal of the vehicle is depressed the less is the total magnitude of each of these purging pulses of diesel fuel injection; in other words, the magnitude of the purging pulses of injected diesel fuel decreases with increasing engine load, which as explained above is a desirable relationship.

Next, from the state as described above in which no injection of diesel fuel is being provided for any of the combustion chambers because no squeezing of diesel fuel is occurring in the pump chamber 55 due to the fact that the second spill port 60 is opened, the disribution port $62_2$ for the second combustion chamber $2_2$ ceases to oppose and correspond to the dimple 58' of the sub output port 58, and subsequently the distribution port $62_1$ for the first combustion chamber $2_1$ comes to oppose and correspond to the dimple 57' of the main output port 57.

Next, when the pump plunger 47 reaches its position as displaced from its extreme leftward position as seen in FIG. 7 by a second predetermined distance, then the second spill port 60 comes to be closed by engaging with the inner surface 101 of the aperture in the wall 68 through which the pump plunger 47 passes, quite independently of the position of the second spill ring 67. Thereafter, from this position as the pump plunger 47 moves to the right, compression of diesel fuel in the pump chamber 55 occurs until the first spill port 59 moves out to the right in FIG. 7 from the central aperture of the first spill ring 66 and comes to be unblocked by the inner peripheral surface of said central aperture of said first spill ring 66. At this time, since as stated above the main output port 57 is opposing and corresponds to the distribution port $62_1$ for the first combustion chamber $2_1$ via its dimple 57', and since substantial pressure is being generated in the pump chamber 55 at this time, a pulse of diesel fuel injection starts to be provided for the fuel injection nozzle $6_1$ of the first combustion chamber $2_1$ via the distribution port $62_1$, the fuel distribution passage $63_1$, the corresponding one way delivery valve 64, and the corresponding fuel distribution conduit 23. The timing of this fuel injection pulse corresponds to the last part of the compression stroke of the piston of the first combustion chamber $2_2$, and thus this pulse of diesel fuel injection serves as a powering pulse of fuel, heat resulting from the combustion of which is substantially converted to mechanical work in the combustion chamber $2_1$ so as to rotate the crankshaft of the internal combustion engine 1.

As will be readily understood, as before, the amount of fuel delivered in this powering pulse of diesel fuel is determined by the axial position of the first spill ring 66. In more detail, the speed of delivery of diesel fuel in the injection of this powering pulse is of course as before predetermined by the construction and dimensions of the parts of the pump 40 and is fixed and constant, and therefore the total amount of fuel in the pulse is determined by the time interval over which the pulse is provided. The time of starting of the powering pulse is as stated above determined by the instant when the pump plunger 47 reaches its position as displaced from its extreme leftward position as seen in FIG. 7 by said second predetermined distance, when the second spill port 60 comes to be closed by engaging with the inner surface 101 of the aperture in the wall 68, and is therefore fixed and predetermined by the position of the wall 68 and of the second spill port 60, and therefore the time interval over which the powering pulse of fuel injection is provided is determined only by the timing of the instant of its cessation, which is as stated above the instant when the first spill port 59 moves out to the right in FIG. 7 from the central aperture of the first spill ring 66 and comes to be unblocked by the inner peripheral surface of said central aperture of said first spill ring 66. This instant is thus determined by the axial position of said first spill ring 66, which as stated above and in the same way as in the previous case is moved to and fro in the axial direction of the pump plunger 47 by the movement of the control lever 71, via the governor device 70, with the governor device 70 moving the first spill ring 59 more to the right in FIG. 7, the more the accelerator pedal of the vehicle is depressed. Of course, the more the first spill ring 66 is moved to the right in FIG. 7, the later is said instant when the first spill port 59 moves out to the right in FIG. 7 from the central aperture of the first spill ring 66 and comes to be unblocked by said first spill ring 66, i.e. the later is the instant of cessation of the powering pulse of injected diesel fuel. Thus, the greater is the depression of the accelerator pedal, the greater is the total magnitude of each of these powering pulses of diesel fuel injection; in other words, the magnitude of the powering pulses of injected diesel fuel increases with increasing engine load, as is appropriate.

It should be noted however that if the above mentioned first predetermined distance, i.e. the distance through which the pump plunger 47 must move from its extreme leftward position as seen in FIG. 7 for said third spill port 61 to come to be closed by said third spill ring 69, is substantially greater than said second predetermined distance, i.e. the distance through which the pump plunger 47 must move from its extreme leftward position as seen in FIG. 7 for said second spill port 60 to come to be closed by engaging with the inner surface 101 of the aperture in the wall 68 (in any case in the foregoing explanation said first predetermined distance has been assumed to be greater than or equal to said second predetermined distance), then the actual positions of the accelerator pedal during non soot catcher purging operation of the diesel engine 1, and during soot catcher purging operation of the diesel engine 1, corresponding to the same value of the magnitude of each of the powering pulses of injected diesel fuel, i.e. corresponding to the same engine load, will be different, according to the difference between the above mentioned first predetermined distance and the above mentioned second predetermined distance; but this will in practice cause no difficulty with regard to the operation of the vehicle. However, it is more convenient in practice for said first predetermined distance to be substantially equal to said second predetermined distance, and in the timing chart shown in FIG. 9 this has been assumed.

Now, the timing chart of FIG. 9 will be explained. The horizontal axis of this chart shows timing, i.e., distance along this axis is proportional to crank angle, starting from the crank angle at which the pump plunger 47 just starts to move to the left in FIG. 7 from its extreme rightwardly displaced position as shown in that figure; and this chart extends horizontally over a total crank angle of 180° or a total pump plunger 47 rotational angle of 90°, i.e. over one quarter of a cycle of the internal combustion engine 1 (which is a four stroke engine).

The first or uppermost line in this chart shows the reciprocating action of the pump plunger 47, i.e. shows that said pump plunger 47 first executes an intake stroke and then executes an ejection stroke. The second line in FIG. 9 shows the opening and closing of the first spill port 59, i.e. shows that during the ejection stroke of the pump plunger 47 the first spill port 59 is first closed until it moves out from the cenral axial aperture of the first spill ring 66 and is unblocked thereby, and is thereafter open. The third line in FIG. 9 shows that during the ejection stroke of the pump plunger 47 the second spill port 60 is first closed until it moves out from the central axial aperture of the second spill ring 67 and is unblocked thereby, is thereafter open until said pump plunger 47 has moved through said second predetermined distance and said second spill port 60 moves into the aperture formed in the wall 68 through which the pump plunger 47 passes and is blocked up by the inner circumferential surface 101 thereof, and is thereafter closed. The fourth line in FIG. 9 shows that when the soot catcher 11 is being purged the third spill port 61 is always closed, due to the supply of actuating electrical energy to the solenoid device 79 by the control device 17. And the fifth line in FIG. 9 shows that when the soot catcher 11 is not being purged the third spill port 61 is open until said pump plunger 47 has moved through said first predetermined distance and said third spill port 61 moves into the central axial aperture of the third spill ring 69 and is blocked thereby, and is thereafter closed. As stated above, in this chart it is assumed that the first predetermined distance is equal to the second predetermined distance, which is desirable.

Figure 9:
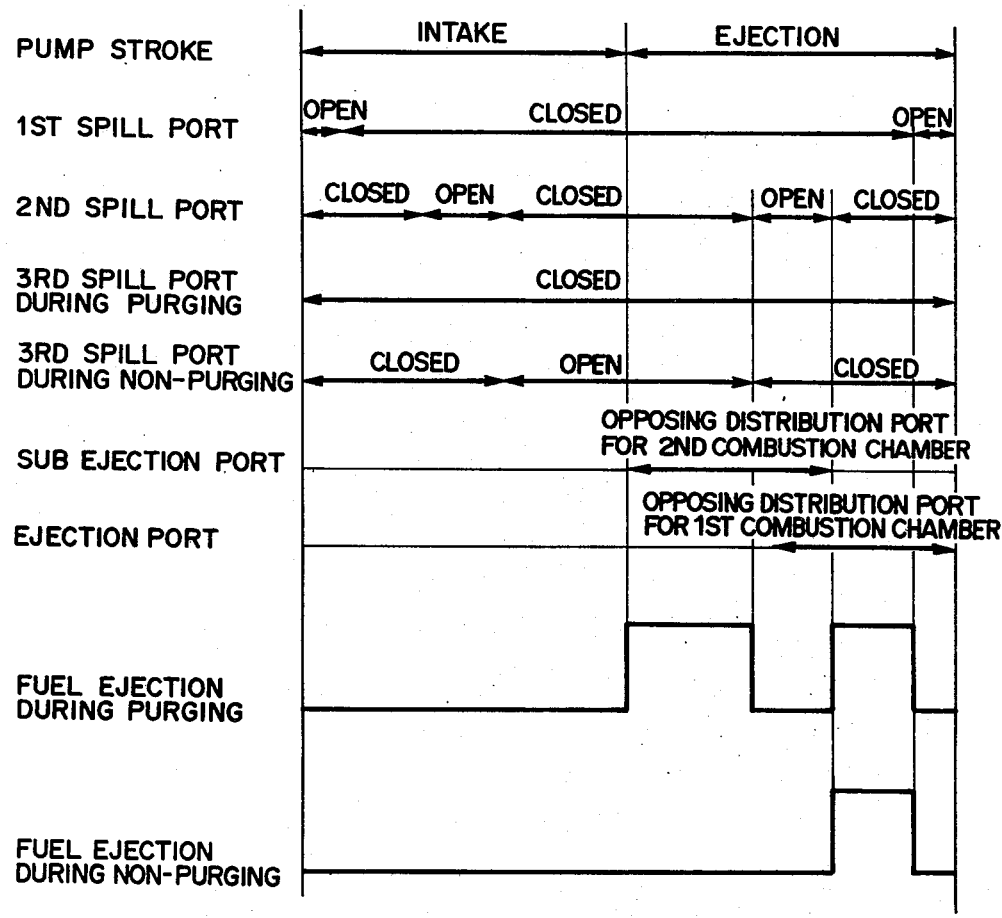
FIG. 9 is a timing chart, in which the opening and closing operation of the ports of the combined diesel fuel injection pump shown in FIGS. 7 and 8, along with the amounts of fuel being injected, are shown with respect to the timing of the diesel internal combustion engine.

The sixth line in FIG. 9 shows the timing period over which the sub ejection port 58 is communicated with the fuel distribution port $62_2$ which corresponds to the second combustion chamber $2_2$ via the dimple 58′, and shows that this timing period includes the first timing period wherein, during the purging operation for the soot catcher 11, all three spill ports 59, 60, and 61 are closed, i.e. the timing period from the start of the ejection stroke of the pump plunger 47 to the opening of the second spill port 60 when it is disengaged from the second spill ring 67. And the seventh line in FIG. 9 shows the timing period over which the main ejection port 57 is communicated with the fuel distribution port $62_1$ which corresponds to the first combustion chamber $2_1$ via the dimple 57′, and shows that this timing period includes the timing period wherein, during either the purging operation for the soot catcher 11 or during non purging operation, all three spill ports 59, 60, and 61 are closed, i.e. the timing period from the closing of the second spill port 60 by the inner wall surface 101 of the aperture in the wall 68 (when the pump plunger has moved through the second predetermined distance) to the opening of the first spill port 59 when it is disengaged from the first spill ring 66.

The last two lines at the bottom of the chart shown in FIG. 9 are similar to the timing chart for fuel injection shown in FIG. 2. The upper one of these shows the starting timing points and the ending timing points of the purging pulse of fuel injection to the second combustion chamber $2_2$ and the powering pulse of fuel injection to the first combustion chamber $2_1$, which are produced as described above, during the purging operation for the soot catcher 11 when the third spill port 61 is closed at all times by the third spill ring 69. And the lowermost line in FIG. 9 shows the starting timing point and the ending timing point of the powering pulse of fuel injection to the first combustion chamber $2_1$, which is produced as described above during the non purging operation of the system for the soot catcher 11, when the third spill port 61 is left open during the first part of the motion of the pump plunger 47 by the third spill ring 69 and therefore the production of the purging pulse of fuel injection to the second combustion chamber $2_2$ is suppressed.

OPERATION OF THE SECOND EMBODIMENT

Now the operation of the fuel supply system shown in FIG. 6, which is the second preferred embodiment of the method according to the present invention, will be described. The timing chart in FIG. 2 is also generally applicable to this second preferred embodiment also. Again, in this second preferred embodiment, the control device 17 receives a signal from the internal combustion engine 1 representative of engine cooling water temperature, and signals from the main fuel injection pump 20 representative of engine load and engine rotational speed, as schematically indicated by directed signal lines in FIG. 6. The control device 17, thus, receives signals representative of engine load, engine revolution speed, engine cooling water temperature, exhaust gas pressure, and exhaust gas temperature; and provides, as in the first preferred embodiment described above, control signals for the solenoid device 79, the electromagnetic actuator 16, and the glow plug energization and control device 8. The algorithm according to which this is done, and the results thereof, is essentially the same as the algorithm explained above with respect to the first preferred embodiment and illustrated with the flow chart shown in FIG. 3, except that instead of the step of sending an "OPEN" signal to the fuel shut off valve 33 incorporated in the purging fuel injection pump 30 and the step of sending an electrical signal to the electromagnetic clutch 35 so as to engage said electromagnetic clutch 35 which were performed in the first algorithm described, instead in this embodiment the control device 17 provides actuating electrical energy for the solenoid device 79, so as to move the third spill ring 69 to the left in FIG. 7 and so as to thereby commence the injection of the purging pulses of diesel fuel for heating up the soot catcher 11. Therefore the details of this algorithm will not be particularly described here, in view of the desirability of compactness of explanation.

In fact, the operation of this second preferred embodiment of the apparatus according to the present invention can produce substantially the same functional results as does the operation of the first preferred embodiment thereof described above, depending of course upon the details of the functioning of the purging fuel injection pump 30 in the first preferred embodiment. The particular merit of this second preferred embodiment of the apparatus according to the present invention is that the above described function of varying the amount of fuel supplied in the purging pulses of injected diesel fuel when purging the soot catcher 11 in such a way that said amount of fuel decreases with increasing engine load so as to use up substantially all of the excess oxygen present in the combustion chambers of the engine after combustion of the powering pulses of injected diesel fuel, which in the first preferred embodiment described above was only suggested as a desirable possibility, is in this second embodiment implemented by a compact apparatus as described above incorporated in the combined fuel injection pump 40.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, the present invention could be applied to a two stroke diesel engine. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. For a diesel engine comprising a cylinder-piston assembly in which a combustion chamber is defined and further comprising a soot catcher,
   a method for purging said soot catcher while said diesel engine is operating with supply of fuel into said combustion chamber at a first timing point in the conventional diesel cycle of operation of said cylinder-piston assembly at which heat produced by combustion of said fuel is effective for producing rotational power from said cylinder-piston assembly, said method comprising supplying additional fuel into said combustion chamber at a second timing point in the conventional diesel cycle of operation of said cylinder-piston assembly at which point the heat produced by the combustion of said additional fuel has no substantial effect for producing additional rotational power from said cylinder-piston assembly but instead is used to burn off the accumulated soot in the soot catcher.

2. A method according to claim 1, including supplying said additional fuel at a second timing point is the last part of the expansion stroke in said conventional diesel cycle of operation of said cylinder-piston assembly.

3. A method according to claim 1, said engine further comprising a glow plug in said combustion chamber, including energizing said glow plug to help ignition of said additional fuel.

4. A method according to claim 1, including varying the amount of said additional fuel according to the amount of oxygen present in said combustion chamber in excess of the amount of oxygen for the fuel supplied at said first timing point.

5. A method according to claim 4, including reducing the amount of said additional fuel as the load on the engine is increased.

6. A method according to claim 1, said engine further comprising an exhaust gas recirculation system, including stopping the exhaust gas recirculation when said additional fuel is supplied.

7. A system for purging a soot catcher for a diesel engine having a cylinder-piston assembly in which a combustion chamber is defined comprising:
   an apparatus for supplying fuel to said diesel engine, including a fuel injection system for injecting fuel into said combustion chamber at a first timing point in the conventional diesel cycle of operation of said cylinder-piston assembly so that heat produced by combustion of said fuel is effective for producing rotational power from said cylinder-piston assembly, said system comprising an auxiliary fuel injection system for injecting additional fuel into said combustion chamber at a second timing point in the conventional diesel cycle of operation of said cylinder-piston assembly so that heat produced by combustion of said additional fuel has no substantial effect of producing additional power from said cylinder-piston assembly but instead is used to burn off the accumulated soot in the soot catcher.

8. An apparatus according to claim 7, said engine further comprising a glow plug provided in said combustion chamber, wherein said glow plug is energized to help ignition of said additional fuel when said auxiliary fuel injection system is operated.

9. An apparatus according to claim 7, said engine further comprising an exhaust gas recirculation system, wherein exhaust gas recirculation is stopped when said auxiliary fuel ignition system is operated.

10. An apparatus according to claim 7, wherein said first mentioned fuel injection system and said auxiliary fuel injection system comprise a common fuel injection and distribution pump which comprises a cylindrical pump plunger having a delivery port and a spill system comprising a spill port and a spill ring, characterized by an additional delivery port formed in said pump plunger as angularly shifted relative to said first mentioned delivery port and an additional spill system comprising an additional spill port formed in said pump plunger and an additional spill ring controlled as separated from said first mentioned spill system according to whether said additional fuel injection system is operated or not.

* * * * *